(12) United States Patent
Chen et al.

(10) Patent No.: US 8,477,467 B2
(45) Date of Patent: Jul. 2, 2013

(54) ELECTROSTATIC DISCHARGE PROTECTION CIRCUIT

(75) Inventors: Lu-An Chen, Keelung (TW); Tai-Hsiang Lai, Miaoli County (TW); Tien-Hao Tang, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 70 days.

(21) Appl. No.: 13/190,578

(22) Filed: Jul. 26, 2011

(65) Prior Publication Data

US 2013/0027821 A1    Jan. 31, 2013

(51) Int. Cl.
*H02H 3/22* (2006.01)

(52) U.S. Cl.
USPC ............................................ 361/56; 361/111

(58) Field of Classification Search
USPC ............................................ 361/56, 58, 111
See application file for complete search history.

(56) References Cited

U.S. PATENT DOCUMENTS

| | | | |
|---|---|---|---|
| 5,596,474 A * | 1/1997 | Wada et al. | 361/111 |
| 5,719,737 A * | 2/1998 | Maloney | 361/111 |
| 5,959,820 A | 9/1999 | Ker et al. | |
| 6,066,879 A | 5/2000 | Lee et al. | |
| 6,459,127 B1 | 10/2002 | Lee et al. | |
| 6,576,934 B2 | 6/2003 | Cheng et al. | |
| 6,590,262 B2 | 7/2003 | Jiang et al. | |
| 6,888,207 B1 | 5/2005 | Hebert | |
| 6,909,149 B2 | 6/2005 | Russ et al. | |
| 6,989,567 B2 | 1/2006 | Tornblad et al. | |
| 7,009,252 B2 | 3/2006 | Lin et al. | |
| 7,027,276 B2 | 4/2006 | Chen | |
| 7,368,761 B1 | 5/2008 | Lai et al. | |
| 7,672,100 B2 | 3/2010 | Van Camp | |
| 2003/0076636 A1 | 4/2003 | Ker et al. | |
| 2008/0225451 A1 * | 9/2008 | Ansel et al. | 361/56 |
| 2008/0259511 A1 * | 10/2008 | Worley | 361/56 |
| 2010/0208398 A1 * | 8/2010 | Jou | 361/56 |

OTHER PUBLICATIONS

Kun-Hsien Lin and Ming-Dou Ker, "Design on Latchup-Free Power-Rail ESD Clamp Circuit in High-Voltage CMOS ICs", 2004, Nanoelectronics and Gigascale Systems Laboratory, Institute of Electronics, National Chiao-Tung University, Taiwain.

Jian-Hsing Lee, J.R. Shih, C.S. Tang, K.C. Liu, Y.H Wu, R.Y. Shiue, T.C. Ong, Y.K. Peng and J.T. Yue, "Novel ESD Protection Structure with Embedded SCR LDMOS for Smart Power Technology", 2002, Taiwan Semiconductor Manufacturing Company, Taiwan.

* cited by examiner

*Primary Examiner* — Danny Nguyen
(74) *Attorney, Agent, or Firm* — WPAT, PC; Justin King

(57) ABSTRACT

An electrostatic discharge protection circuit is located between a first voltage terminal and a second voltage terminal. The electrostatic discharge protection circuit includes a first semiconductor switch and a second semiconductor switch. The first semiconductor switch is electrically connected to the first voltage terminal. If a voltage at the first voltage terminal complies with a starting condition, the first semiconductor switch is turned on, so that an electrostatic discharge current flows through the first voltage terminal and the first semiconductor switch. The second semiconductor switch is electrically connected between the first semiconductor switch and the second voltage terminal, wherein the electrostatic discharge current from the first semiconductor switch passes to the second voltage terminal through the second semiconductor switch.

27 Claims, 22 Drawing Sheets

| Semiconductor switch type | Gate thickness | Breakdown voltage | Structure |
|---|---|---|---|
| High voltage semiconductor switch (HV) | High gate | > the voltage at the first voltage terminal | NMOS |
| low breakdown device (LBD) | High gate | < the voltage at the first voltage terminal | NMOS |
| high voltage silicon-controlled rectifier (HVSCR) | High gate | > the voltage at the first voltage terminal | SCR |
| low voltage semiconductor switches (LV) | Low gate | < the voltage at the first voltage terminal | NMOS or PMOS |
| high gate-low voltage semiconductor switches (HGLV) | High gate | > the voltage at the first voltage terminal | NMOS or PMOS |

FIG. 6

| Number | trigger voltage $V_t(V)$ | holding voltage $V_h(V)$ | second-breakdown current $I_{t2}(A)$ |
|---|---|---|---|
| 1 | 41.9 | 14.0 | 2.13 |
| 2 | 59.0 | 27.7 | 2.44 |
| 3 | 81.5 | 40.0 | 2.29 |

FIG. 7C

| Number | trigger voltage $V_t(V)$ | holding voltage $V_h(V)$ | second-breakdown current $I_{t2}(A)$ |
|---|---|---|---|
| 2 | 26.9 | 20.2 | 2.6 |
| 3 | 38.0 | 30.4 | 3.5 |

FIG. 9C

| Number | trigger voltage $V_t(V)$ | holding voltage $V_h(V)$ | second-breakdown current $I_{t2}(A)$ |
|---|---|---|---|
| 5 | 61.2 | 39.2 | 2.81 |

FIG. 10C

ELECTROSTATIC DISCHARGE PROTECTION CIRCUIT

FIELD OF THE INVENTION

The present invention relates to an electrostatic discharge protection circuit, and more particularly to an electrostatic discharge protection circuit implemented by a plurality of semiconductor switches.

BACKGROUND OF THE INVENTION

Electrostatic discharge (ESD) is one of main factors that cause electrical overstress (EOS) damage to many electronic components. For protecting the electronic components from electrostatic damage, the integrated circuit (IC) is usually equipped with an electrostatic discharge protection circuit for providing an ESD current path. The sudden ESD current is conducted via the ESD current path and blocked from flowing into the integrated circuit in order to protect the integrated circuit.

Generally, the electrostatic discharge current is conducted to the internal portion of the integrated circuit through its pins. For protecting the functional circuits within the integrated circuit, the electrostatic discharge protection circuit is usually arranged beside input/output bonding pads to bypass the ESD current nearby. In views of electrostatic discharge protection, it is necessary to install ESD conducting paths between an input pad, an output pad, a voltage source and a ground terminal.

FIG. 1 schematically illustrates a full-chip protection configuration for protecting a functional circuit within an integrated circuit. As shown in FIG. 1, a plurality of electrostatic discharge protection circuits are connected between the voltage source, the ground terminal, the input/output pads and the functional circuit 11.

A first node N1 is set between the input pad 12 and the functional circuit 11. For preventing generation of the ESD current at the input pad 12, the first node N1 is connected to a voltage source Vdd and a ground terminal Vss through a first electrostatic discharge protection circuit 101 and a second electrostatic discharge protection circuit 102, respectively. By the first electrostatic discharge protection circuit 101, the ESD current between the input pad 12 and the voltage source Vdd fails to flow to the functional circuit 11. By the second electrostatic discharge protection circuit 102, the ESD current between the input pad 12 and the ground terminal Vss fails to flow to the functional circuit 11.

Similarly, a second node N2 is set between the output pad 13 and the functional circuit 11. For preventing generation of the ESD current at the output pad 13, the second node N2 is connected to the voltage source Vdd and the ground terminal Vss through a third electrostatic discharge protection circuit 103 and a fourth electrostatic discharge protection circuit 104, respectively. By the third electrostatic discharge protection circuit 103, the ESD current between the output pad 13 and the voltage source Vdd fails to flow to the functional circuit 11. By the fourth electrostatic discharge protection circuit 104, the ESD current between the output pad 13 and the ground terminal Vss fails to flow to the functional circuit 11.

Since the electrostatic discharge is possibly generated at the region between the voltage source Vdd and the ground terminal Vss, a fifth electrostatic discharge protection circuit 105 is further provided between the voltage source Vdd and the ground terminal Vss. Depending on the flowing directions of the ESD current, the design of the fifth electrostatic discharge protection circuit 105 is variable. The present invention is directed to the electrostatic discharge protection circuit 105 between the voltage source Vdd and the ground terminal Vss.

FIG. 2 is a schematic functional block diagram illustrating the fifth electrostatic discharge protection circuit as shown in FIG. 1. In FIG. 2, the electrostatic discharge protection circuit 20 includes two sub-circuits, i.e. an electrostatic discharge detection circuit 207 and an electrostatic discharge clamp circuit 208. These two sub-circuits are electrically connected between the voltage source Vdd and the ground terminal Vss.

The electrostatic discharge detection circuit 207 is used for sensing whether the electrostatic discharge $S_{esd}$ is generated. Once the electrostatic discharge $S_{esd}$ is sensed, a corresponding signal is outputted from the electrostatic discharge detection circuit 207 to the electrostatic discharge clamp circuit 208. That is, the electrostatic discharge detection circuit 207 is used for only detecting the electrostatic discharge without conducting the ESD current. Whereas, in a case that the electrostatic discharge occurs, the electrostatic discharge clamp circuit 208 is triggered by the electrostatic discharge detection circuit 207. Consequently, the ESD current is conducted by the electrostatic discharge clamp circuit 208 while keeping away from the functional circuit 11 inside the integrated circuit chip.

FIG. 3 is plot illustrating the current-voltage relationship of a conventional electrostatic discharge clamp circuit. Generally, the parameters indicating the characteristics of the electrostatic discharge clamp circuit include a trigger voltage Vt, a holding voltage Vh and a second-breakdown current It2.

The trigger voltage Vt of the electrostatic discharge clamp circuit 208 denotes the voltage that enables the electrostatic discharge clamp circuit 208. Moreover, the trigger voltage Vt of the electrostatic discharge clamp circuit 208 is relevant to the speed of conducting the ESD current. For designing the electrostatic discharge clamp circuit 208, the trigger voltage Vt of the electrostatic discharge clamp circuit 208 should be lower than the trigger voltage Vt of the functional circuit.

Once the electrostatic discharge occurs, the electrostatic discharge clamp circuit 208 responds to the electrostatic discharge earlier than the functional circuit in order to prevent the electrostatic discharge current from flowing to the functional circuit. If the trigger voltage Vt of the electrostatic discharge clamp circuit 208 is too high, the timing of enabling the electrostatic discharge clamp circuit 208 is too late. Under this circumstance, the efficacy of the electrostatic discharge clamp circuit 208 is largely impaired. Moreover, in response to the trigger voltage Vt of the electrostatic discharge clamp circuit 208, a snapback phenomenon occurs.

The holding voltage Vh denotes a snapback breakdown voltage of the semiconductor device. The holding voltage Vh should be higher than the voltage of the voltage source. If the holding voltage Vh is lower than the voltage of the voltage source Vdd, the semiconductor device is suffered from the snapback problem. Since the holding voltage Vh of the semiconductor device is maintained constant, if the voltage of the voltage source Vdd is higher than the holding voltage Vh, a leakage current is continuously generated and passes through the semiconductor device. Due to the occurrence of the leakage current, the semiconductor device is possibly burnt out to cause a transient latch-up problem. That is, for designing the electrostatic discharge clamp circuit 208, the holding voltage Vh should be higher than the voltage of the voltage source Vdd.

If the voltage of the electrostatic discharge exceeds the second-breakdown point, the ESD current is abruptly increased. The second-breakdown current It2 denotes the maximum allowable leakage current that can be withstood by the electrostatic discharge clamp circuit 208. Once the ESD current reaches the second-breakdown current It2, the leakage current drift is generated. Under this circumstance, the semiconductor devices within electrostatic discharge clamp circuit 208 will be burnt out.

That is, if the transient voltage resulting from the electrostatic discharge reaches the trigger voltage Vt, the electrostatic discharge clamp circuit 208 is enabled. Then, as the voltage is decreased, the relationship between the leakage current and the voltage pulls the voltage back to the holding voltage Vh. As the voltage is continuously changed, if the voltage reaches the second-breakdown current It2, it means that the electrostatic discharge clamp circuit 208 is burnt out.

From the above discussions, the characteristics of the trigger voltage Vt, the holding voltage Vh and the second-breakdown current It2 should be taken into consideration when designing the electrostatic discharge clamp circuit, so that the performance of the electrostatic discharge clamp circuit will be enhanced. Therefore, there is a need of providing an improved electrostatic discharge clamp circuit.

SUMMARY OF THE INVENTION

In accordance with an aspect, the present invention provides an electrostatic discharge protection circuit. The electrostatic discharge protection circuit is located between a first voltage terminal and a second voltage terminal. The electrostatic discharge protection circuit includes a first semiconductor switch and a second semiconductor switch. The first semiconductor switch is electrically connected to the first voltage terminal. If a voltage at the first voltage terminal complies with a starting condition, the first semiconductor switch is turned on, so that an electrostatic discharge current flows through the first voltage terminal and the first semiconductor switch. The second semiconductor switch is electrically connected between the first semiconductor switch and the second voltage terminal, wherein the electrostatic discharge current from the first semiconductor switch passes to the second voltage terminal through the second semiconductor switch.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6 is a table listing the characteristics of several types of semiconductor switches used in the electrostatic discharge protection circuit of the present invention;

FIG. 7C is table illustrating the trigger voltage, the holding voltage and the second-breakdown current for different numbers of high voltage semiconductor switches of the electrostatic discharge clamp circuit;

FIG. 9C is table illustrating the trigger voltage, the holding voltage and the second-breakdown current for different numbers of low breakdown voltage devices of the electrostatic discharge clamp circuit as shown in FIG. 9B;

FIG. 10C is table illustrating the trigger voltage, the holding voltage and the second-breakdown current for an electrostatic discharge clamp circuit with a high voltage semiconductor switch and five low voltage semiconductor switches;

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As previously described, in designing the electrostatic discharge clamp circuit, the trigger voltage, the holding voltage and the second-breakdown current should be taken into consideration. That is, there is a need of providing an electrostatic discharge clamp circuit with a low trigger voltage Vt, a high holding voltage Vh and a high second-breakdown current It2.

The electrostatic discharge protection circuit includes an electrostatic discharge detection circuit and an electrostatic discharge clamp circuit. According to the connection terminal, the electrostatic discharge detection circuit and the electrostatic discharge clamp circuit may be connected with each other in a gate-driven manner or a substrate-triggered manner. Hereinafter, two ways of connecting the electrostatic discharge detection circuit with the electrostatic discharge clamp circuit in the gate-driven manner and the substrate-triggered manner will be illustrated with reference to FIGS. 4A and 4B.

Figure 1:
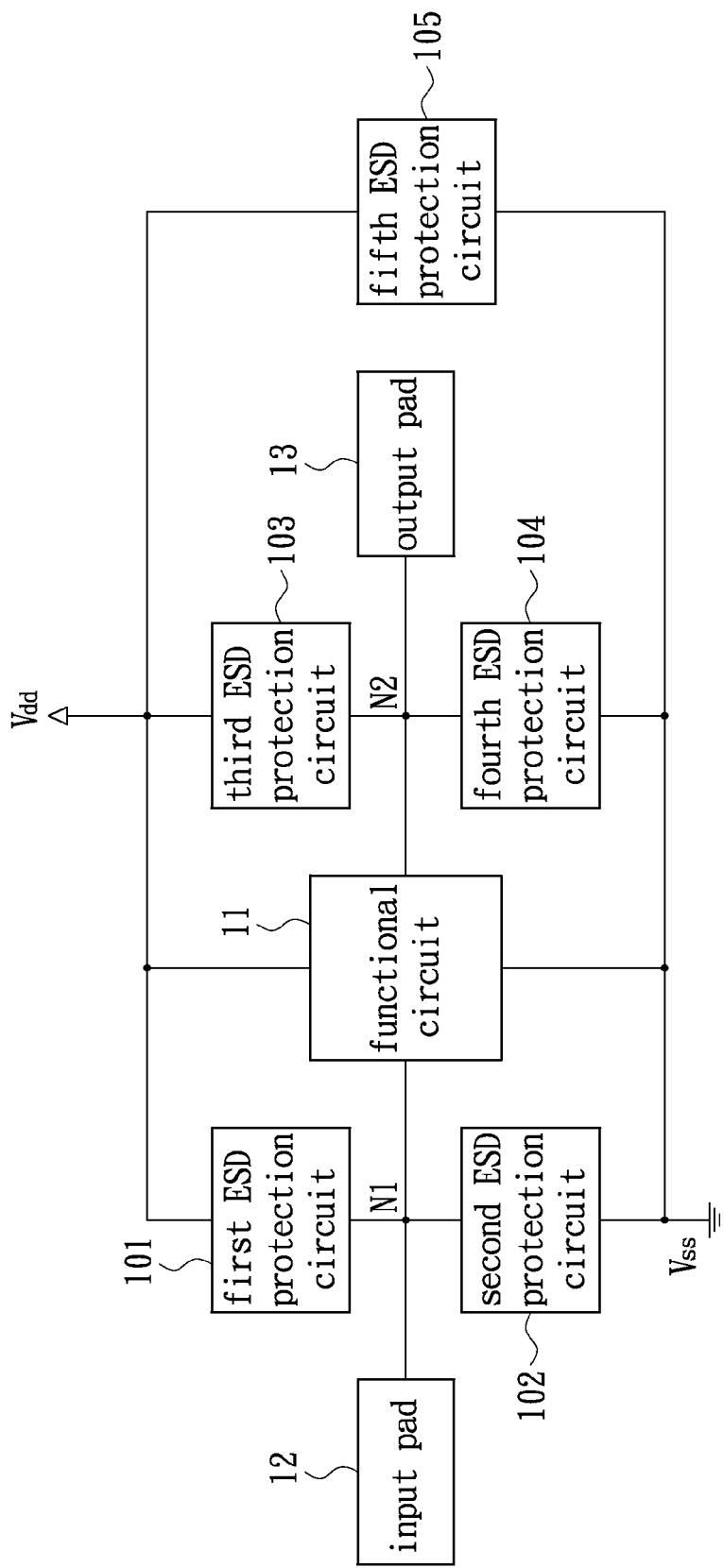
FIG. 1 schematically illustrates a full-chip protection configuration for protecting a functional circuit within an integrated circuit.
Figure 2:
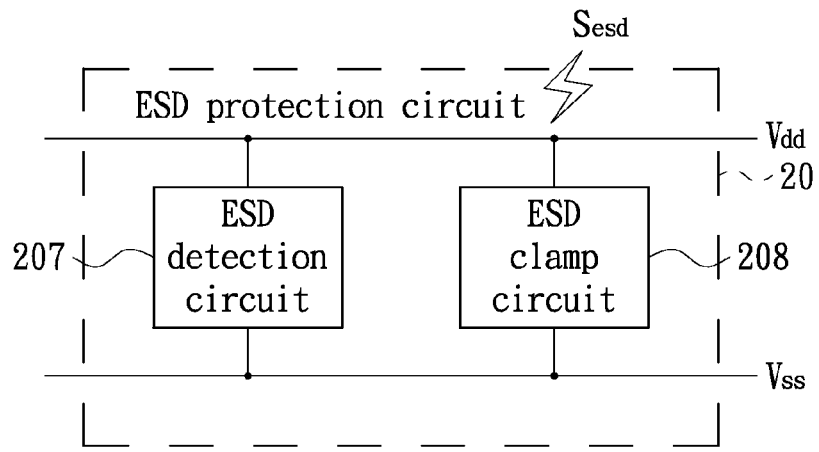
FIG. 2 is a schematic functional block diagram illustrating the fifth electrostatic discharge protection circuit as shown in FIG. 1.
Figure 3:
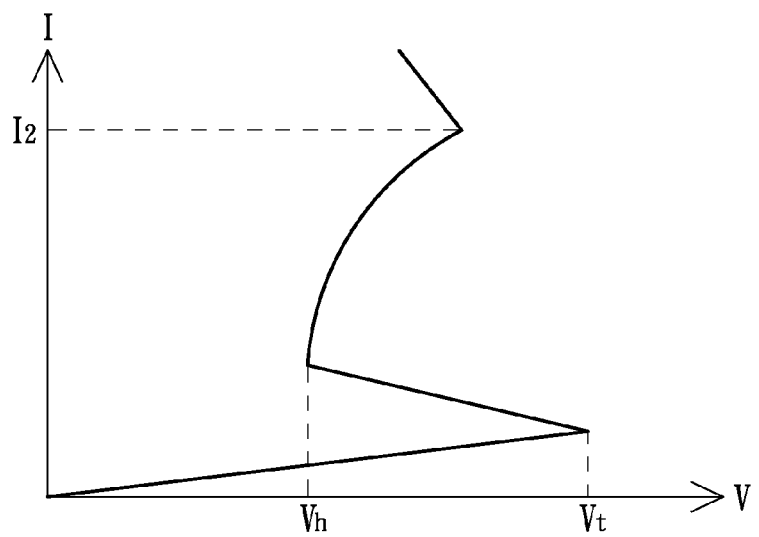
FIG. 3 is plot illustrating the current-voltage relationship of a conventional electrostatic discharge clamp circuit.
Figure 4A:
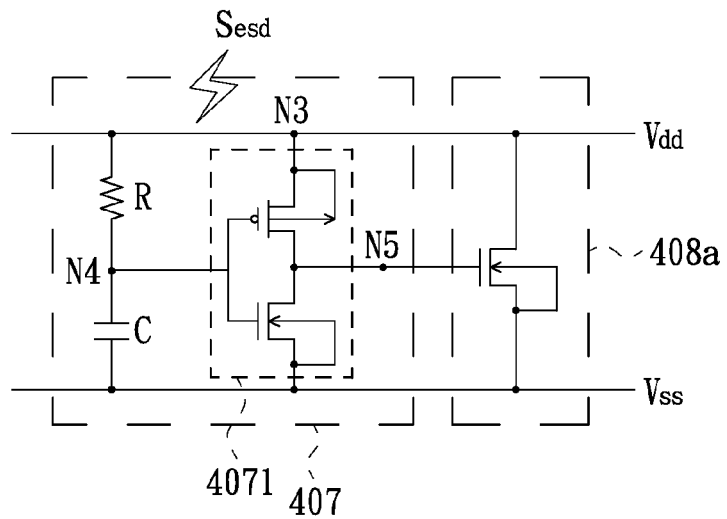
FIG. 4A schematically illustrates an electrostatic discharge protection circuit, in which the electrostatic discharge detection circuit and the electrostatic discharge clamp circuit are connected with each other in a gate-driven manner.
Figure 4B:
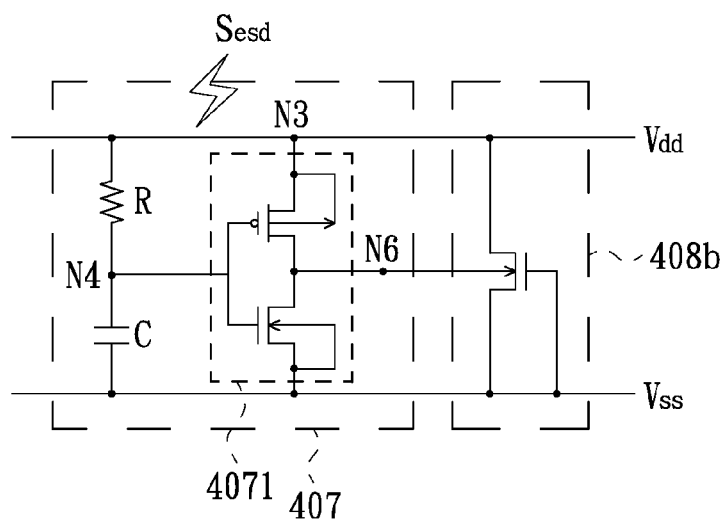
FIG. 4B schematically illustrates an electrostatic discharge protection circuit, in which the electrostatic discharge detection circuit and the electrostatic discharge clamp circuit include are connected with each other in a substrate-triggered manner.

As shown in FIGS. 4A and 4B, the electrostatic discharge detection circuit 407 includes a low pass filter (LPF) and an inverter 4071. The low pass filter is composed of a resistor R and a capacitor C. The inverter 4071 is composed of an N-type MOSFET (NMOS) transistor and a p-type MOSFET (PMOS) transistor.

FIG. 4A schematically illustrates an electrostatic discharge protection circuit, in which the electrostatic discharge detection circuit and the electrostatic discharge clamp circuit are connected with each other in a gate-driven manner.

In a normal operating status of the chip, since the third node N3 is connected to the voltage source Vdd, the voltage of the fourth node has a magnitude Vdd, so that the PMOS transistor of the inverter 4071 is turned off. On the other hand, the NMOS transistor of the inverter 4071 is turned on. Since the NMOS transistor of the inverter 4071 is connected to the ground terminal Vss, if the NMOS transistor of the inverter 4071 is turned on, the voltage of the fifth node N5 has a magnitude Vss. Under this circumstance, the NMOS transistor of the electrostatic discharge clamp circuit 408a is not turned on.

In a case that the electrostatic discharge is generated at the third node N3, the voltage at the third node N3 is abruptly increased. Due to the frequency response of the low pass filter, the fourth node N4 is temporarily maintained at the low voltage level. Correspondingly, the gates of the PMOS transistor and the NMOS transistor are both maintained at the low voltage level. Under this circumstance, the PMOS transistor is turned on, but the NMOS transistor is shut off. After the PMOS transistor is turned on, the voltage at the fifth node N5 is changed to have the same high voltage level as the voltage at the third node N3.

Due to the change of the voltage at the fifth node N5, the voltage difference between both terminals of the electrostatic discharge clamp circuit 408a is increased, so that the NMOS transistor of the electrostatic discharge clamp circuit 408a is turned on. Under this circumstance, the static electricity generated at the third node N3 is conducted to the ground terminal Vss through the electrostatic discharge clamp circuit 408a.

In FIG. 4A, since the fifth node N5 is connected to the gate of the NMOS transistor of the electrostatic discharge clamp circuit 408a, the electrostatic discharge detection circuit is connected with the electrostatic discharge clamp circuit in a gate-driven manner.

FIG. 4B schematically illustrates an electrostatic discharge protection circuit, in which the electrostatic discharge detection circuit and the electrostatic discharge clamp circuit include are connected with each other in a substrate-triggered manner. The operating principles and functions of the electrostatic discharge detection circuit 407 as shown in FIG. 4B are similar to those of FIG. 4A, and are not redundantly described herein. In comparison with FIG. 4A, the sixth node N6 is connected to the substrate of the NMOS transistor of the electrostatic discharge clamp circuit 408b of FIG. 4B. In other words, the electrostatic discharge detection circuit 407 is connected with the electrostatic discharge clamp circuit in a substrate-triggered manner.

Moreover, the electrostatic discharge clamp circuit may be implemented by field oxide devices (FOD). Since the field oxide device has no gate, the electrostatic discharge detection circuit is connected with the electrostatic discharge clamp circuit in only the substrate-triggered manner, rather than the gate-driven manner. Since the field oxide device has no gate, the field oxide device has a structure similar to the bipolar junction transistor (BJT) to conduct the ESD current. However, this type of semiconductor device is not widely used, and additional libraries are required while using such semiconductor device for circuit design.

In other words, the current ways for connecting the electrostatic discharge detection circuit with the electrostatic discharge clamp circuit are restricted to specified connecting manners. In addition, the method of fabricating such semiconductor device is complicated.

Consequently, the electrostatic discharge clamp circuit of the present invention is implemented by the suitable combination of PMOS transistors or NMOS transistors. Since the PMOS transistors or NMOS transistors have respective gates, the electrostatic discharge clamp circuit can be connected with the electrostatic discharge detection circuit in the gate-driven manner or the substrate-triggered manner. Moreover, since the PMOS transistors or NMOS transistors may be fabricated by the semiconductor manufacturing process, the electrostatic discharge clamp circuit is easily implemented.

The present invention provides an electrostatic discharge protection circuit, which is located between a first voltage terminal V1 (e.g. a voltage source Vdd) and a second voltage terminal V2 (e.g. a ground terminal Vss). The electrostatic discharge protection circuit is operated with a functional circuit. Moreover, a start threshold voltage of the electrostatic discharge protection circuit is lower than a failure threshold voltage of the functional circuit.

In an embodiment, the electrostatic discharge protection circuit includes only an electrostatic discharge protection circuit. In another embodiment, the electrostatic discharge protection circuit includes an electrostatic discharge clamp circuit and an electrostatic discharge detection circuit. The electrostatic discharge clamp circuit and the electrostatic discharge detection circuit are located between the first voltage terminal V1 and the second voltage terminal V2.

Figure 5A:
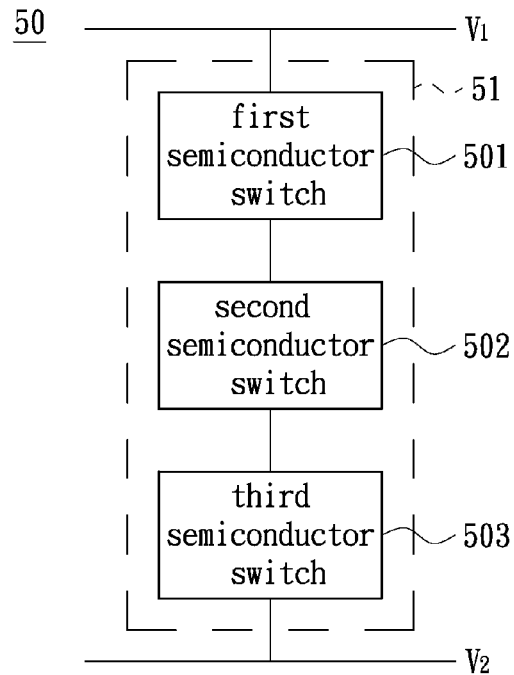
FIG. 5A schematically illustrates an electrostatic discharge protection circuit with an electrostatic discharge clamp circuit but without an electrostatic discharge detection circuit according to an embodiment of the present invention.

FIG. 5A schematically illustrates an electrostatic discharge protection circuit with an electrostatic discharge clamp circuit but without an electrostatic discharge detection circuit according to an embodiment of the present invention. In this embodiment, no electrostatic discharge detection circuit is included in the electrostatic discharge protection circuit 50. In a case that the voltage at the first voltage terminal V1 is higher than a start threshold voltage, the electrostatic discharge clamp circuit 51 generates an ESD current. Consequently, the static electricity generated at the first voltage terminal V1 flows to the second voltage terminal V2 through the electrostatic discharge clamp circuit 51.

The electrostatic discharge clamp circuit 51 at least includes a first semiconductor switch 501 and a second semiconductor switch 502. The first semiconductor switch 501 is electrically connected to the first voltage terminal V1. In a case that the voltage at the first voltage terminal V1 complies with a starting condition, the first semiconductor switch 501 is turned on, so that the ESD current generated at the first voltage terminal V1 can pass through the first semiconductor switch 501. The second semiconductor switch 502 is electrically connected between the first semiconductor switch 501 and the second voltage terminal V2. The ESD current from the first semiconductor switch 501 passes to the second voltage terminal V2 through the second semiconductor switch 502. The starting condition is satisfied when the voltage at the first voltage terminal V1 is higher than the start threshold voltage of the electrostatic discharge clamp circuit 51.

Optionally, the electrostatic discharge clamp circuit 51 further includes a third semiconductor switch 503. The third semiconductor switch 503 is electrically connected between the second semiconductor switch 502 and the second voltage terminal V2. The ESD current from the second semiconductor switch 502 passes to the second voltage terminal V2 through the third semiconductor switch 503.

The semiconductor switches are for example NMOS transistors. In a case that the electrostatic discharge protection circuit 50 includes only two NMOS transistors, the drain and source of the first NMOS transistor are respectively electrically connected to the first voltage terminal V1 and the drain of the second NMOS transistor. The source of the second NMOS transistor is electrically connected to the second voltage terminal V2.

Whereas, in a case that the electrostatic discharge protection circuit 50 includes three NMOS transistors, the drain and source of the first NMOS transistor are respectively electrically connected to the first voltage terminal V1 and the drain of the second NMOS transistor. The drain and source of the second NMOS transistor are respectively electrically connected to the source of the first NMOS transistor and the drain of the third NMOS transistor. The source of the third NMOS transistor is connected to the second voltage terminal V2. It is noted that the electrostatic discharge clamp circuit 51 may include more than three NMOS transistors. The ways of connecting these NMOS transistors are similar to those of FIG. 5A, and are not redundantly described herein.

In some embodiments, the electrostatic discharge protection circuit includes an electrostatic discharge clamp circuit and an electrostatic discharge detection circuit. In this situation, the electrostatic discharge clamp circuit is enabled earlier. That is, the trigger voltage of the electrostatic discharge clamp circuit is reduced. In a case that the electrostatic discharge is generated at the first voltage terminal V1 and the voltage at the first voltage terminal V1 complies with a starting condition, a trigger voltage is outputted from the electrostatic discharge detection circuit. In response to the trigger voltage, the electrostatic discharge clamp circuit is enabled to generate the ESD current. Hereinafter, two examples of the electrostatic discharge protection circuit with an electrostatic discharge clamp circuit and an electrostatic discharge detection circuit will be illustrated with reference to FIGS. 5B and 5E.

Figure 5B:
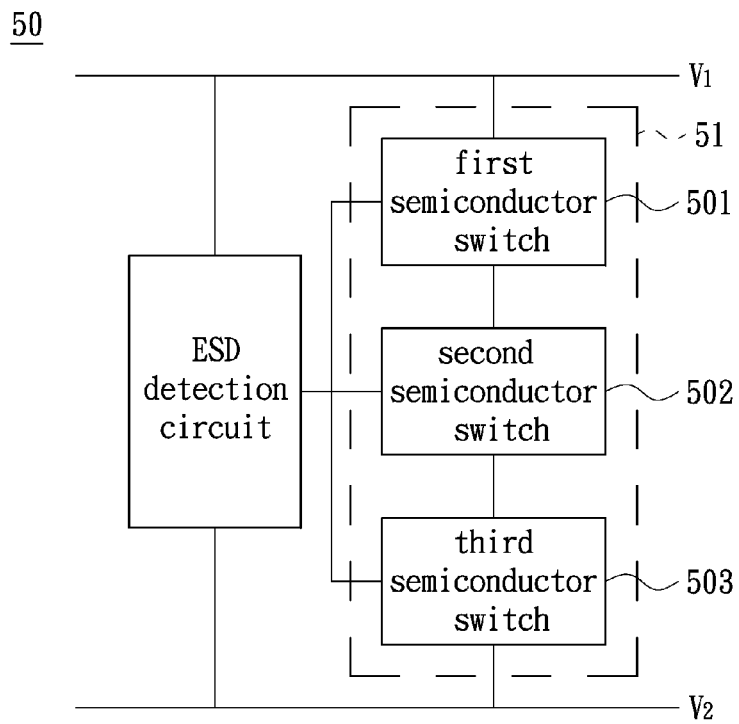
FIG. 5B schematically illustrates an electrostatic discharge protection circuit with an electrostatic discharge clamp circuit and an electrostatic discharge detection circuit according to an embodiment of the present invention.

As shown in FIG. 5B, the electrostatic discharge protection circuit 50 includes an electrostatic discharge clamp circuit 51 and an electrostatic discharge detection circuit 52. The configurations of the electrostatic discharge clamp circuit 51 are similar to those of FIG. 5A, and are not redundantly described herein. In this embodiment, all of the semiconductor switches are connected with the electrostatic discharge detection circuit 52. That is, these semiconductor switches are connected to the electrostatic discharge detection circuit 52.

Figure 5C:
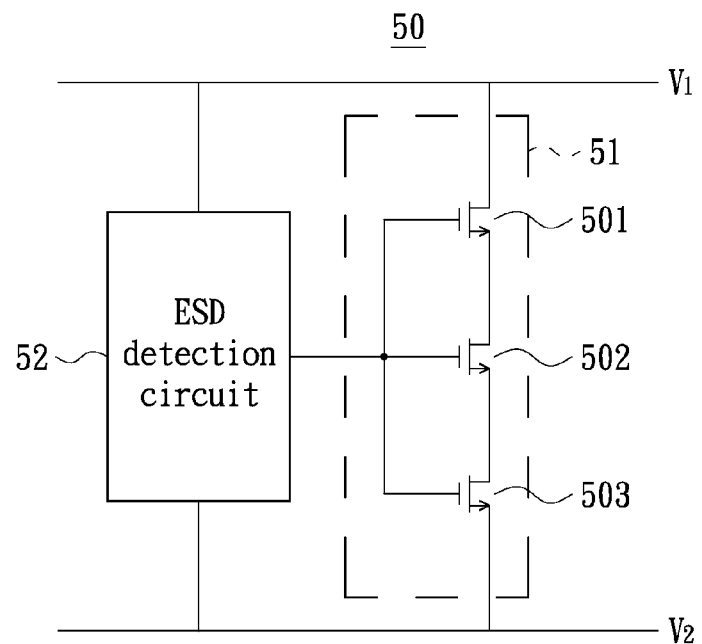
FIG. 5C schematically illustrates the electrostatic discharge protection circuit of FIG. 5B, in which the electrostatic discharge detection circuit and the semiconductor switches among the electrostatic discharge clamp circuit are connected with each other in a gate-driven manner.

FIG. 5C schematically illustrates the electrostatic discharge protection circuit of FIG. 5B, in which the electrostatic discharge detection circuit and the semiconductor switches among the electrostatic discharge clamp circuit are connected with each other in a gate-driven manner.

In this embodiment, the drain of the first semiconductor switch 501 is connected to the first voltage terminal V1. The source of the first semiconductor switch 501 is connected to the drain of the second semiconductor switch 502. The source of the second semiconductor switch 502 is connected to the drain of the third semiconductor switch 503. The source of the third semiconductor switch 503 is connected to the second voltage terminal V2. In addition, the gates of these semiconductor switches are all electrically connected with the electrostatic discharge detection circuit 52.

Figure 5D:
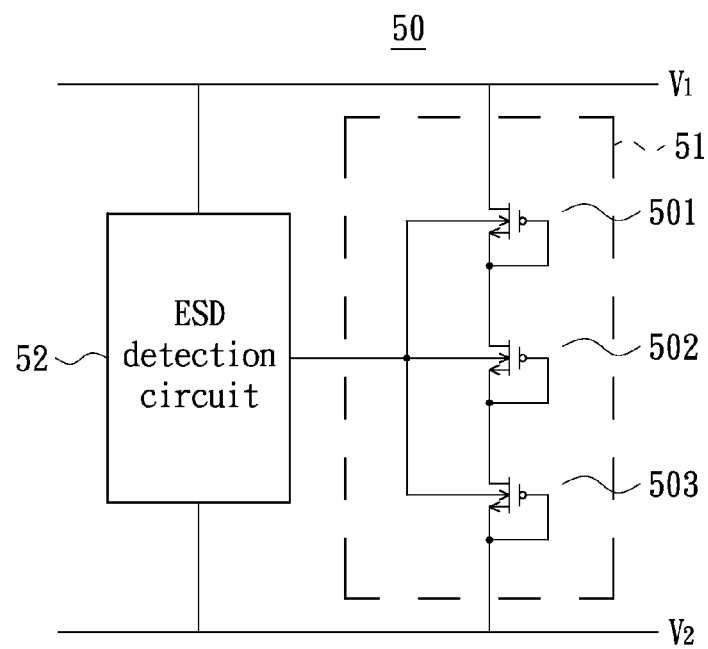
FIG. 5D schematically illustrates the electrostatic discharge protection circuit of FIG. 5B, in which the electrostatic discharge detection circuit and the semiconductor switches among the electrostatic discharge clamp circuit are connected with each other in a substrate-triggered manner.

FIG. 5D schematically illustrates the electrostatic discharge protection circuit of FIG. 5B, in which the electrostatic discharge detection circuit and the semiconductor switches among the electrostatic discharge clamp circuit are connected with each other in a substrate-triggered manner.

In this embodiment, the relationships between the first semiconductor switch 501, the second semiconductor switch 502, the third semiconductor switch 503, the first voltage terminal V1 and the second voltage terminal V2 are similar to those of FIG. 5C except that the substrates of these semiconductor switches are all electrically connected with the electrostatic discharge detection circuit 52.

Figure 5E:
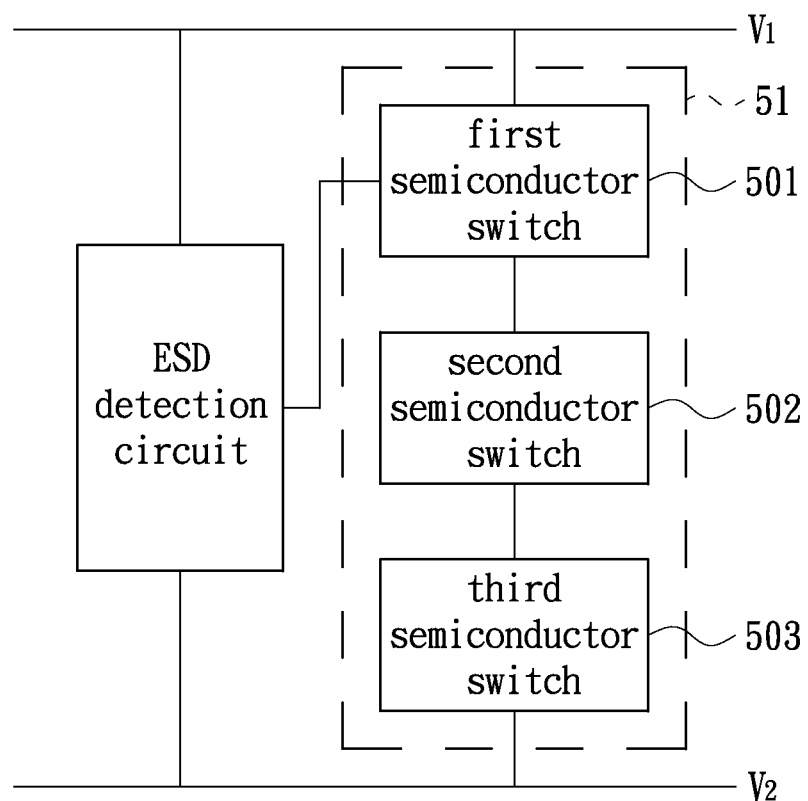
FIG. 5E schematically illustrates an electrostatic discharge protection circuit with an electrostatic discharge clamp circuit and an electrostatic discharge detection circuit according to another embodiment of the present invention.

As shown in FIG. 5E, the electrostatic discharge protection circuit 50 includes an electrostatic discharge clamp circuit 51 and an electrostatic discharge detection circuit 52. The configurations of the electrostatic discharge clamp circuit 51 are similar to those of FIG. 5A, and are not redundantly described herein. In this embodiment, the first semiconductor switch 501 is electrically connected with the electrostatic discharge detection circuit 52. The other semiconductor switches are electrically connected with each other and electrically connected between the first semiconductor switch 501 and the second voltage terminal V2. That is, a terminal (e.g. the drain) of the second semiconductor switch 502 is electrically connected with a terminal (e.g. the source) of the first semiconductor switch 501. The third semiconductor switch 503 is electrically connected between the second semiconductor switch 502 and the second voltage terminal V2.

Of course, the connection between the first semiconductor switch 501 and the electrostatic discharge detection circuit 52 may be varied depending on the gate-driven manner or the substrate-triggered manner. That is, the gate-driven manner and the substrate-triggered manner are similar to those shown in FIGS. 5C and 5D, and are not redundantly described herein. Whereas, in this embodiment, the second semiconductor switch 502 and the third semiconductor switch 503 are not connected with the electrostatic discharge detection circuit 52.

The electrostatic discharge protection circuit of FIG. 5B and the electrostatic discharge protection circuit of FIG. 5E are somewhat distinguished. That is, all semiconductor switches of the electrostatic discharge protection circuit of FIG. 5B are electrically connected with each other. Whereas, in the electrostatic discharge protection circuit of FIG. 5C, except for the first semiconductor switch 501, the gate of each of the other semiconductor switches is electrically connected to a terminal of a corresponding semiconductor switch and a terminal of an upstream semiconductor switch.

For example, the semiconductor switches are NMOS transistors. The electrostatic discharge clamp circuit 51 of FIG. 5B includes a first semiconductor switch 501 (first NMOS transistor), a second semiconductor switch 502 (second NMOS transistor) and a third semiconductor switch 503 (third NMOS transistor). The first NMOS transistor, the second NMOS transistor and the second NMOS transistor are electrically connected with the electrostatic discharge detection circuit 52. The drain of the first NMOS transistor is electrically connected to the first voltage terminal V1. The source of the first NMOS transistor is electrically connected to the drain of the second NMOS transistor. The source of the second NMOS transistor is electrically connected to the drain of the third NMOS transistor. The source of the third NMOS transistor is electrically connected to the second voltage terminal V2.

The electrostatic discharge clamp circuit 51 of FIG. 5E includes a first semiconductor switch 501 (first NMOS transistor), a second semiconductor switch 502 (second NMOS transistor) and a third semiconductor switch 503 (third NMOS transistor). The gate or the substrate of only the first NMOS transistor is electrically connected to the electrostatic discharge detection circuit 52. The gate of the second NMOS transistor is electrically connected to the source of the first NMOS transistor. The gate of the third NMOS transistor is electrically connected to the source of the second NMOS transistor.

For withstanding the abrupt voltage change of electrostatic discharge and providing better electrostatic discharge protection efficacy, the electrostatic discharge protection circuit of FIG. 5 may be modified or varied. Some variant examples of the electrostatic discharge protection circuit will be illustrated in more details as follows. The number of the semiconductor switches included in the electrostatic discharge clamp circuit 51 of the following examples is three. According to the practical requirements, the number of the semiconductor switches may be altered.

For example, the electrostatic discharge clamp circuit 51 may further comprise a fourth semiconductor switch (not shown). The fourth semiconductor switch is identical to the second semiconductor switch 502 and the third semiconductor switch 503. The connection of the fourth semiconductor switch of the electrostatic discharge clamp circuit 51 is similar to the third semiconductor switch 503 by analog.

From the above description, the electrostatic discharge protection circuit of the present invention is located between a first voltage terminal V1 and a second voltage terminal V2. The electrostatic discharge protection circuit 50 at least includes a first semiconductor switch 501 and a second semiconductor switch 502. The first semiconductor switch 501 is electrically connected to the first voltage terminal V1. In a case that the voltage at the first voltage terminal V1 complies with a starting condition, the first semiconductor switch 501 is turned on, so that the ESD current generated at the first voltage terminal V1 flows through the first semiconductor switch 501. The second semiconductor switch 502 is electrically connected between the first semiconductor switch 501 and the second voltage terminal V2. The ESD current from the first semiconductor switch 501 passes to the second voltage terminal V2 through the second semiconductor switch 502.

Hereinafter, several types of semiconductor switches used in the electrostatic discharge protection circuit of the present invention will be illustrated with reference to a list of FIG. 6, several variant examples of FIGS. 7~15 and the connecting ways of FIGS. 5A, 5B and 5E.

FIG. 6 is a table listing the characteristics of several types of semiconductor switches used in the electrostatic discharge protection circuit of the present invention. The first column of this table denotes the type of the semiconductor switch. The second column of this table denotes the gate thickness of the semiconductor switch. The third column of this table denotes the breakdown voltage of the semiconductor switch. The fourth column of this table denotes the possible structure of the semiconductor switch.

A first type semiconductor switch is a high voltage semiconductor switch (HV) whose gate and drain are capable of withstanding high voltages. Since this high voltage semiconductor switch (HV) has a thicker gate, the high voltage semiconductor switch (HV) is also referred as a high gate (HG) semiconductor switch. The breakdown voltage of the high voltage semiconductor switch (HV) is higher than the voltage at the first voltage terminal V1. The high voltage semiconductor switch (HV) may be implemented as an NMOS transistor.

A second type semiconductor switch is a low breakdown voltage device (LBD), which is also a high gate (HG) semiconductor switch. The breakdown voltage of the low breakdown voltage device (LBD) is lower than the voltage at the first voltage terminal V1. The low breakdown voltage device (LBD) is may be implemented as an NMOS transistor.

A third type semiconductor switch is a silicon-controlled rectifier (SCR) such as a high voltage silicon-controlled rectifier (HVSCR), which is also a high gate (HG) semiconductor switch. The breakdown voltage of the silicon-controlled rectifier (SCR) is higher than the voltage at the first voltage terminal V1. When the silicon-controlled rectifier (SCR) is turned on, the silicon-controlled rectifier (SCR) is clamped at the low voltage level. Moreover, the silicon-controlled rectifier (SCR) has small parasitic capacitance.

A fourth type semiconductor switch is a low voltage semiconductor switch (LV), which has a thinner gate. The low voltage semiconductor switch is also referred as a low gate (LG) semiconductor switch The breakdown voltage of the low voltage semiconductor switch (LV) is lower than the voltage at the first voltage terminal V1. The low voltage semiconductor switch (LV) may be implemented as an NMOS transistor or a PMOS transistor. Since the layout area of the low voltage semiconductor switch (LV) is relatively small, the cost of the electrostatic discharge protection circuit is reduced.

A fifth type semiconductor switch is a high gate low voltage semiconductor switch (HGLV), which has a high gate. The breakdown voltage of the high gate low voltage semiconductor switch (HGLV) is lower than the voltage at the first voltage terminal V1. The high gate low voltage semiconductor switch (HGLV) may be implemented as an NMOS transistor or a PMOS transistor.

In the following embodiments, the semiconductor switches of the electrostatic discharge clamp circuit are illustrated by referring to NMOS transistors. Nevertheless, the semiconductor switches of the electrostatic discharge clamp circuit can be implemented by PMOS transistors.

In the embodiments of FIGS. 7~9, each electrostatic discharge clamp circuit includes the same types of semiconductor switches, and the semiconductor switches are electrically connected in the manner as shown in FIGS. 5A and 5B. In the embodiments of FIGS. 10~12, the second semiconductor switch and the third semiconductor switch included in each electrostatic discharge clamp circuit are low voltage semiconductor switches (LV), and the semiconductor switches are electrically connected in the manner as shown in FIGS. 5A and 5E. In the embodiments of FIGS. 13~15, the second semiconductor switch and the third semiconductor switch included in each electrostatic discharge clamp circuit are high gate low voltage semiconductor switches (HGLV), and the semiconductor switches are electrically connected in the manner as shown in FIGS. 5A, 5B and 5E.

Figure 7A:
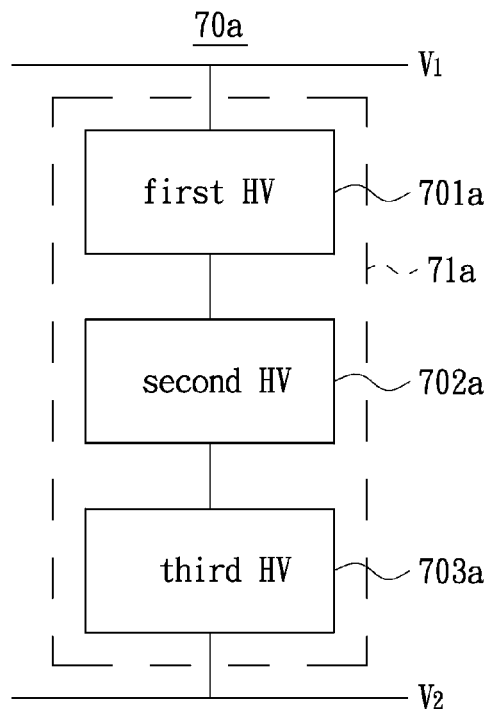
FIG. 7A schematically illustrates an electrostatic discharge protection circuit with an electrostatic discharge clamp circuit including three high voltage semiconductor switches, which are connected in the same manner as shown in FIG. 5A.
Figure 7B:
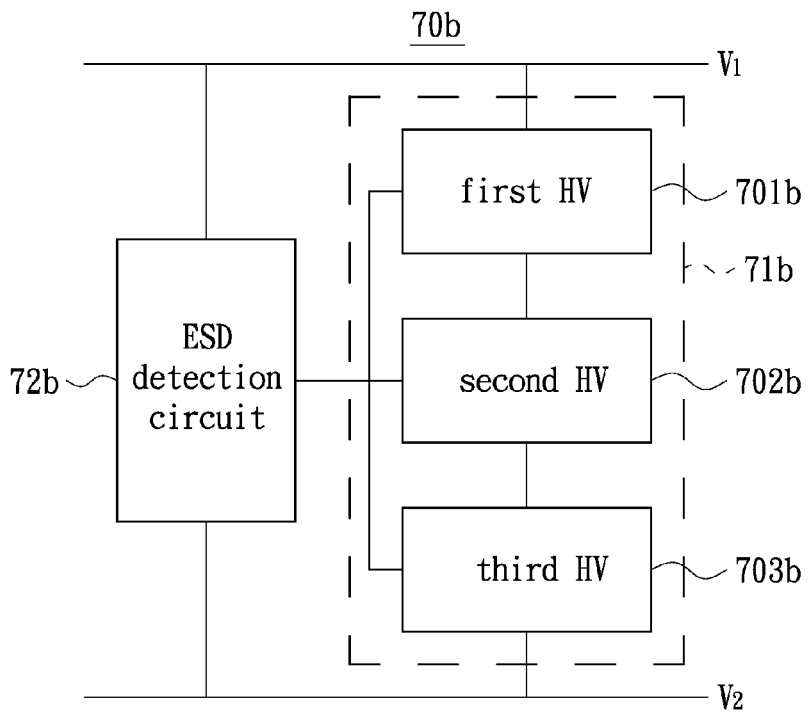
FIG. 7B schematically illustrates an electrostatic discharge protection circuit with an electrostatic discharge clamp circuit and an electrostatic discharge detection circuit, wherein the electrostatic discharge clamp circuit includes three high voltage semiconductor switches connected in the same manner as shown in FIG. 5B.

In the first embodiment of FIGS. 7A and 7B, the semiconductor switches are all high voltage semiconductor switches, wherein the breakdown voltage of each high voltage semiconductor switch is higher than the voltage at the first voltage terminal V1. The electrostatic discharge protection circuit of FIG. 7A only includes an electrostatic discharge clamp circuit, and the high voltage semiconductor switches are electrically connected in the same manner as shown in FIG. 5A. The electrostatic discharge protection circuit of FIG. 7B includes an electrostatic discharge clamp circuit and an electrostatic discharge detection circuit, and the high voltage semiconductor switches are electrically connected in the same manner as shown in FIG. 5B.

FIG. 7A schematically illustrates an electrostatic discharge protection circuit with an electrostatic discharge clamp circuit including three high voltage semiconductor switches, which are electrically connected in the same manner as shown in FIG. 5A. That is, all of the first semiconductor switch, the second semiconductor switch and the third semiconductor switch are high voltage semiconductor switches (HV), wherein the breakdown voltage of each high voltage semiconductor switch is higher than the voltage at the first voltage terminal V1.

As shown in FIG. 7A, the electrostatic discharge protection circuit 70a includes only an electrostatic discharge clamp circuit 71a. The electrostatic discharge clamp circuit 71a includes a first high voltage semiconductor switch (first HV) 701a, a second high voltage semiconductor switch (second HV) 702a and a third high voltage semiconductor switch (third HV) 703a, which are electrically connected with each other in series.

FIG. 7B schematically illustrates an electrostatic discharge protection circuit with an electrostatic discharge clamp circuit and an electrostatic discharge detection circuit, wherein the electrostatic discharge clamp circuit includes three high voltage semiconductor switches electrically connected in the same manner as shown in FIG. 5B.

As shown in FIG. 7B, the electrostatic discharge protection circuit 70b includes an electrostatic discharge clamp circuit 71b and an electrostatic discharge detection circuit 72b. The electrostatic discharge clamp circuit 71b includes a first high voltage semiconductor switch (first HV) 701b, a second high voltage semiconductor switch (second HV) 702b and a third high voltage semiconductor switch (third HV) 703b. These high voltage semiconductor switches are located between the first voltage terminal V1 and the second voltage terminal V2. In addition, these high voltage semiconductor switches are electrically connected with each other in series, and are all electrically connected with the electrostatic discharge detection circuit 72b.

Similarly, depending on the gate-driven manner or the substrate-triggered manner, the relationships between the high voltage semiconductor switches (HV) of the electrostatic discharge clamp circuit 71b and the electrostatic discharge detection circuit 72b may be varied. For example, according to the gate-driven manner, the gates of respective high voltage semiconductor switches (HV) are all electrically connected to the electrostatic discharge detection circuit 72b. Whereas, according to the substrate-triggered manner, the substrates of respective high voltage semiconductor switches (HV) are all electrically connected to the electrostatic discharge detection circuit 72b.

Since the gate and drain of the high voltage semiconductor switch are capable of withstanding high voltages, the high voltage semiconductor switch is suitably used as the component of the electrostatic discharge clamp circuit. However, if all of the three high voltage semiconductor switches (HV) are replaced by the low voltage semiconductor switches (LV), the reliability of the electrostatic discharge clamp circuit will be deteriorated.

In a case that the electrostatic discharge clamp circuit includes a plurality of serially-connected high voltage semiconductor switches (HV), the relationship between the voltage and the leakage current is varied depending on the number of the high voltage semiconductor switches (HV). That is, if the number of the serially-connected high voltage semiconductor switches (HV) is changed, the trigger voltage and the holding voltage of the electrostatic discharge clamp circuit will be correspondingly changed.

FIG. 7C is table illustrating the trigger voltage, the holding voltage and the second-breakdown current for different numbers of high voltage semiconductor switches of the electrostatic discharge clamp circuit.

In a case that only a high voltage semiconductor switch is included in the electrostatic discharge clamp circuit, the trigger voltage is 41.9V, the holding voltage is 14V, and the second-breakdown current 2.13V. In a case that two serially-connected high voltage semiconductor switches are included in the electrostatic discharge clamp circuit, the trigger voltage is 59V, the holding voltage is 27.7V, and the second-breakdown current 2.44V. In a case that three serially-connected high voltage semiconductor switches are included in the electrostatic discharge clamp circuit, the trigger voltage is 81.5V, the holding voltage is 40V, and the second-breakdown current 2.29V.

Figure 8A:
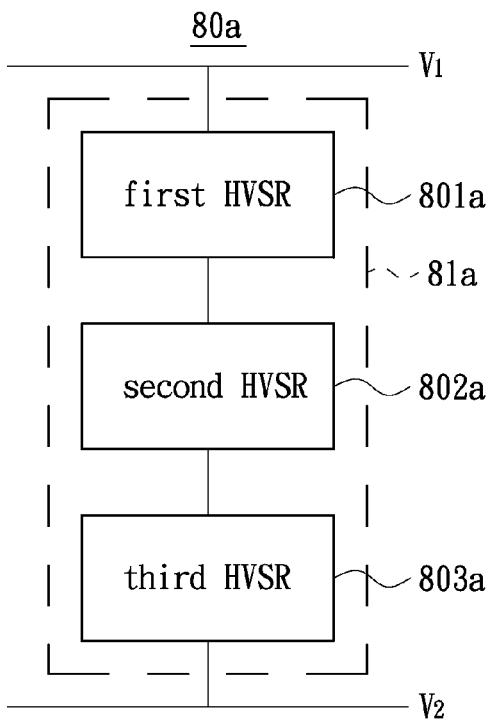
FIG. 8A schematically illustrates an electrostatic discharge protection circuit with an electrostatic discharge clamp circuit including three high voltage silicon-controlled rectifiers, which are connected in the same manner as shown in FIG. 5A.
Figure 8B:
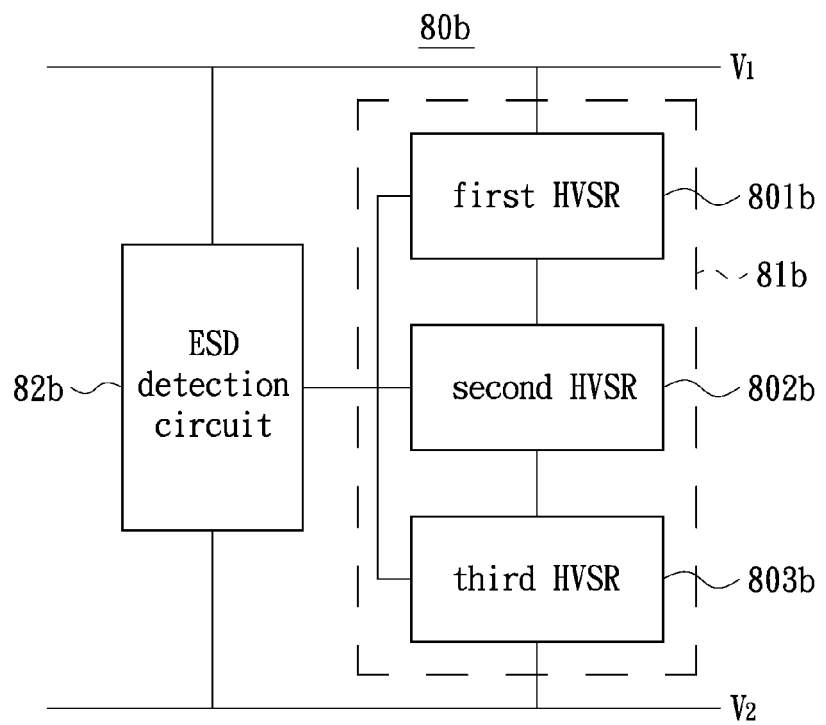
FIG. 8B schematically illustrates an electrostatic discharge protection circuit with an electrostatic discharge clamp circuit and an electrostatic discharge detection circuit, wherein the electrostatic discharge clamp circuit includes three high voltage silicon-controlled rectifiers connected in the same manner as shown in FIG. 5B.

In the second embodiment of FIGS. 8A and 8B, the first semiconductor switch, the second semiconductor switch and the third semiconductor switch are all high voltage silicon-controlled rectifiers (HVSCR), wherein the breakdown voltage of each high voltage silicon-controlled rectifier (HVSCR) is higher than the voltage at the first voltage terminal V1. The electrostatic protection clamp circuit 80a of FIG. 8A only includes an electrostatic discharge clamp circuit 81a. The electrostatic discharge protection circuit 80b of FIG. 8B includes an electrostatic discharge clamp circuit 81b and an electrostatic discharge detection circuit 82b.

FIG. 8A schematically illustrates an electrostatic discharge protection circuit with an electrostatic discharge clamp circuit including three high voltage silicon-controlled rectifiers, which are electrically connected in the same manner as shown in FIG. 5A.

As shown in FIG. 8A, the electrostatic discharge protection circuit 80a includes only an electrostatic discharge clamp circuit 81a. The electrostatic discharge clamp circuit 81a includes a first high voltage silicon-controlled rectifier (first HVSCR) 801a, a second high voltage silicon-controlled rectifier (second HVSCR) 802a and a third high voltage silicon-controlled rectifier (third HVSCR) 803a, which are electrically connected with each other in series.

FIG. 8B schematically illustrates an electrostatic discharge protection circuit with an electrostatic discharge clamp circuit and an electrostatic discharge detection circuit, wherein the electrostatic discharge clamp circuit includes three high voltage silicon-controlled rectifiers connected in the same manner as shown in FIG. 5B.

As shown in FIG. 8B, the electrostatic discharge protection circuit 80b includes an electrostatic discharge clamp circuit 81b and an electrostatic discharge detection circuit 82b. The electrostatic discharge clamp circuit 81b includes a first high voltage silicon-controlled rectifier (first HVSCR) 801b, a second high voltage silicon-controlled rectifier (second HVSCR) 802b and a third high voltage silicon-controlled rectifier (third HVSCR) 803b. These high voltage silicon-controlled rectifiers are all electrically connected with the electrostatic discharge detection circuit 82b.

Similarly, depending on the gate-driven manner or the substrate-triggered manner, the relationships between the high voltage silicon-controlled rectifiers (HVSCR) of the electrostatic discharge clamp circuit 81b and the electrostatic discharge detection circuit 82b may be varied. For example, according to the gate-driven manner, the gates of respective high voltage silicon-controlled rectifiers (HVSCR) are all electrically connected to the electrostatic discharge detection circuit 82b. Whereas, according to the substrate-triggered manner, the substrates of respective high voltage silicon-controlled rectifiers (HVSCR) are all electrically connected to the electrostatic discharge detection circuit 82b.

In FIGS. 8A and 8B, the electrostatic discharge clamp circuit 81a or 81b with three serially-connected high voltage silicon-controlled rectifiers (HVSCR) is illustrated. It is noted that the number of the high voltage silicon-controlled rectifiers (HVSCR) may be adjusted according to the practical requirements.

Figure 9A:
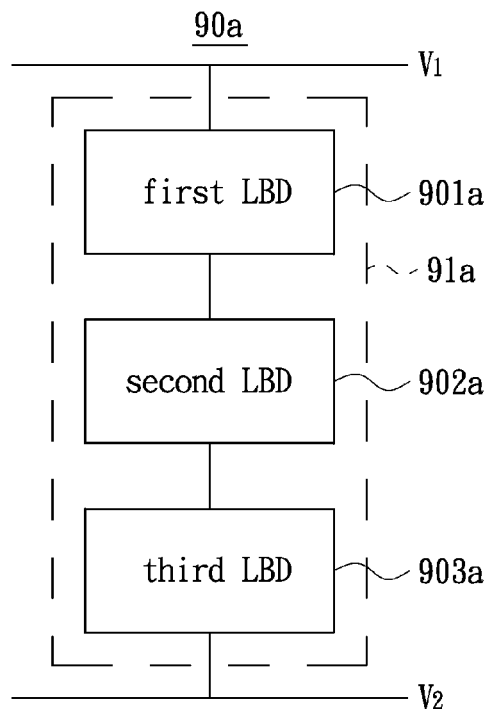
FIG. 9A schematically illustrates an electrostatic discharge protection circuit with an electrostatic discharge clamp circuit including three low breakdown voltage devices, which are connected in the same manner as shown in FIG. 5A.
Figure 9B:
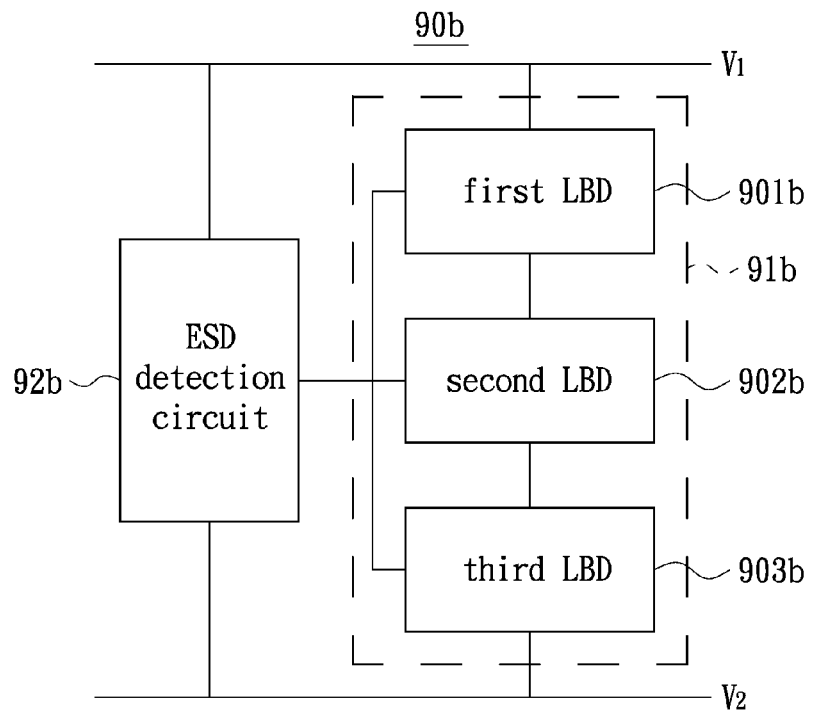
FIG. 9B schematically illustrates an electrostatic discharge protection circuit with an electrostatic discharge clamp circuit and an electrostatic discharge detection circuit, wherein the electrostatic discharge clamp circuit includes three low breakdown voltage devices connected in the same manner as shown in FIG. 5B.

In the third embodiment of FIGS. 9A and 9B, the electrostatic discharge protection circuit includes an electrostatic discharge clamp circuits 91a or 91b and optionally an electrostatic discharge detection circuit, wherein the electrostatic discharge clamp circuits 91a or 91b is implemented by three low breakdown voltage devices (LBD). That is, the first semiconductor switch, the second semiconductor switch and the third semiconductor switch of the electrostatic discharge clamp circuits 91a or 91b are all low breakdown voltage devices (LBD), wherein the breakdown voltage of each low breakdown voltage device (LBD) is lower than the voltage at the first voltage terminal V1. The electrostatic discharge protection circuit 90a of FIG. 9A only includes an electrostatic discharge clamp circuit 91a. The electrostatic discharge protection circuit 90b of FIG. 9B includes an electrostatic discharge clamp circuit 91b and an electrostatic discharge detection circuit 92b.

FIG. 9A schematically illustrates an electrostatic discharge protection circuit with an electrostatic discharge clamp circuit including three low breakdown voltage devices, which are electrically connected in the same manner as shown in FIG. 5A.

As shown in FIG. 9A, the electrostatic discharge protection circuit 90a includes only an electrostatic discharge clamp circuit 91a. The electrostatic discharge clamp circuit 91a includes a first low breakdown voltage device (first LBD) 901a, a second low breakdown voltage device (second LBD) 902a and a third low breakdown voltage device (third LBD) 903a, which are electrically connected with each other in series.

FIG. 9B schematically illustrates an electrostatic discharge protection circuit with an electrostatic discharge clamp circuit and an electrostatic discharge detection circuit, wherein the electrostatic discharge clamp circuit includes three low breakdown voltage devices electrically connected in the same manner as shown in FIG. 5B.

As shown in FIG. 9B, the electrostatic discharge protection circuit 90b includes an electrostatic discharge clamp circuit 91b and an electrostatic discharge detection circuit 92b. The electrostatic discharge clamp circuit 91b includes a first low breakdown voltage device (first LBD) 901a, a second low breakdown voltage device (second LBD) 902a and a third low breakdown voltage device (third LBD) 903a. These low breakdown voltage devices are all electrically connected with the electrostatic discharge detection circuit 92b. That is, the low breakdown voltage devices (LBD) of the electrostatic discharge clamp circuit 91b are electrically connected with each other.

Similarly, depending on the gate-driven manner or the substrate-triggered manner, the relationships between the low breakdown voltage devices (LBD) of the electrostatic discharge clamp circuit 91b and the electrostatic discharge detection circuit 92b may be varied. For example, according to the gate-driven manner, the gates of respective low breakdown voltage devices (LBD) are all electrically connected to the electrostatic discharge detection circuit 92b. Whereas, according to the substrate-triggered manner, the substrates of respective low breakdown voltage devices (LBD) are all electrically connected to the electrostatic discharge detection circuit 92b.

FIG. 9C is table illustrating the trigger voltage Vt, the holding voltage Vh and the second-breakdown current It2 for different numbers of low breakdown voltage devices of the electrostatic discharge clamp circuit as shown in FIG. 9B.

In a case that two serially-connected low breakdown voltage devices (LBD) are included in the electrostatic discharge clamp circuit, the trigger voltage is 26.9V, the holding voltage is 20.2V, and the second-breakdown current 2.6V. In a case that three serially-connected low breakdown voltage devices (LBD) are included in the electrostatic discharge clamp circuit, the trigger voltage is 38.0V, the holding voltage is 30.4V, and the second-breakdown current 3.5V.

In FIGS. 9A and 9B, the electrostatic discharge clamp circuit 91a or 91b with three low breakdown voltage devices (LBD) is illustrated. It is noted that the number of the low breakdown voltage devices (LBD) may be adjusted according to the practical requirements.

From the above description in FIGS. 7~9, all of the semiconductor switches included in the electrostatic discharge clamp circuit 71a or 71b are high voltage semiconductor switches (HV); all of the semiconductor switches included in the electrostatic discharge clamp circuit 81a or 81b are high voltage silicon-controlled rectifiers (HVSCR); and all of the semiconductor switches included in the electrostatic discharge clamp circuit 91a or 91b are low breakdown voltage devices (LBD).

In the embodiments of FIGS. 10~15, the electrostatic discharge clamp circuit is established by combining a high voltage semiconductor switch (HV), a low breakdown voltage device (LBD) or a high voltage silicon-controlled rectifier (HVSCR) with two low voltage semiconductor switches (LV) or two high gate low voltage semiconductor switches (HGLV). The electrostatic discharge clamp circuit may be operated with an electrostatic discharge detection circuit to form an electrostatic discharge protection circuit.

In the embodiments of FIGS. 10~12, the second semiconductor switch and the third semiconductor switch included in each electrostatic discharge clamp circuit are low voltage semiconductor switches (LV), and the semiconductor switches are electrically connected in the manner as shown in FIGS. 5A and 5E. In these embodiments, the electrostatic discharge clamp circuit with two low voltage semiconductor switches (LV) is illustrated. It is noted that the number of the low voltage semiconductor switches (LV) may be adjusted according to the practical requirements.

Figure 10A:
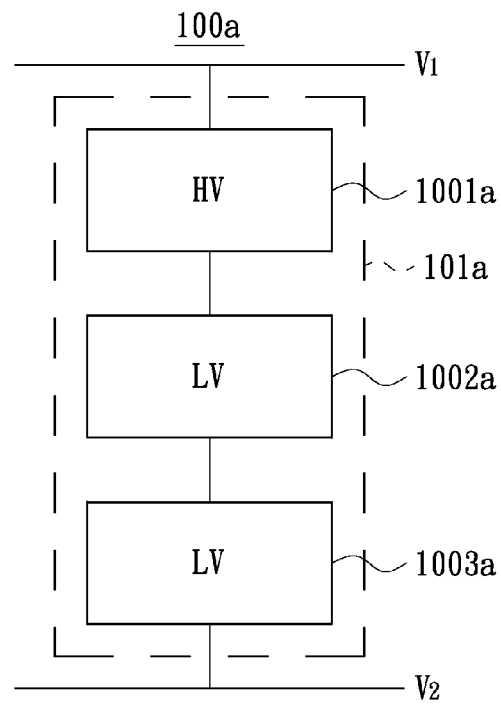
FIG. 10A schematically illustrates an electrostatic discharge protection circuit with an electrostatic discharge clamp circuit including a high voltage semiconductor switch and two low voltage semiconductor switches, which are connected in the same manner as shown in FIG. 5A.
Figure 10B:
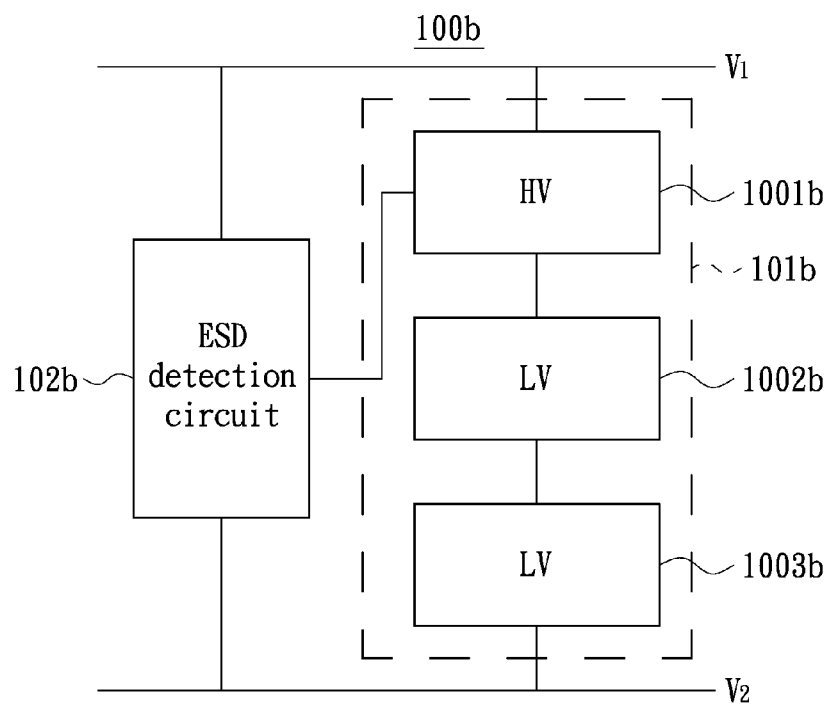
FIG. 10B schematically illustrates an electrostatic discharge protection circuit with an electrostatic discharge clamp circuit and an electrostatic discharge detection circuit, wherein the electrostatic discharge clamp circuit includes a high voltage semiconductor switch and two low voltage semiconductor switches connected in the same manner as shown in FIG. 5E.

In the fourth embodiment of FIGS. 10A and 10B, the first semiconductor switch is a high voltage semiconductor switch (HV), and the second semiconductor switch and the third semiconductor switch are low voltage semiconductor switches (LV). The breakdown voltage of the high voltage semiconductor switch (HV) is higher than the voltage at the first voltage terminal V1. The breakdown voltage of each low voltage semiconductor switch (LV) is lower than the voltage at the first voltage terminal V1.

FIG. 10A schematically illustrates an electrostatic discharge protection circuit with an electrostatic discharge clamp circuit including a high voltage semiconductor switch and two low voltage semiconductor switches, which are electrically connected in the same manner as shown in FIG. 5A.

As shown in FIG. 10A, the electrostatic discharge protection circuit 100a includes only an electrostatic discharge clamp circuit 101a. The electrostatic discharge clamp circuit 101a includes a high voltage semiconductor switch (HV) 1001a and two low voltage semiconductor switches (LV) 1002a, 1003a, which are electrically connected in series.

FIG. 10B schematically illustrates an electrostatic discharge protection circuit with an electrostatic discharge clamp circuit and an electrostatic discharge detection circuit, wherein the electrostatic discharge clamp circuit includes a high voltage semiconductor switch and two low voltage semiconductor switches electrically connected in the same manner as shown in FIG. 5E.

As shown in FIG. 10B, the electrostatic discharge protection circuit 100b includes an electrostatic discharge clamp circuit 101b and an electrostatic discharge detection circuit 102b. The electrostatic discharge clamp circuit 101b includes a high voltage semiconductor switch (HV) 1001b and two low voltage semiconductor switches (LV) 1002b, 1003b.

The electrostatic discharge detection circuit 102b and the electrostatic discharge clamp circuit 101b are both located between the first voltage terminal V1 and the second voltage terminal V2. In addition, the electrostatic discharge detection circuit 102b is electrically connected to the high voltage semiconductor switch (HV) 1001b of the electrostatic discharge clamp circuit 101b.

In a case that these semiconductor switches are all NMOS transistors, the source of the high voltage semiconductor switch (HV) 1001b is electrically connected with the drain of the underlying low voltage semiconductor switch (LV) 1002b. The source of the low voltage semiconductor switch (LV) 1002b is electrically connected with the drain of the underlying low voltage semiconductor switch (LV) 1003b. Moreover, the gate or the substrate of only the high voltage semiconductor switch (HV) 1001b is electrically connected to the electrostatic discharge detection circuit 102b.

FIG. 10C is table illustrating the trigger voltage, the holding voltage and the second-breakdown current for an electrostatic discharge clamp circuit with a high voltage semiconductor switch and five low voltage semiconductor switches. The high voltage semiconductor switch (HV) and the five low voltage semiconductor switches (LV) are electrically connected in the manner as shown in FIG. 10B. In this electrostatic discharge clamp circuit, the trigger voltage is 61.2V, the holding voltage is 39.2V, and the second-breakdown current 2.81V. The area of the high voltage semiconductor switch (HV) is about 6054 square micrometer (i.e. 61.4 μm×98.6 μm≈6054 μm²). The area of the low voltage semiconductor switch (LV) is about 2388 square micrometer (i.e. 79.6 μm×30 μm≈2388 μm²). That is, the area of the low voltage semiconductor switch (LV) is much lower than the low voltage semiconductor switch (LV). Consequently, even if the number of low voltage semiconductor switches (LV) included in the electrostatic discharge clamp circuit increases, the electrostatic discharge clamp circuit is beneficial in views of the overall layout area.

Figure 11A:
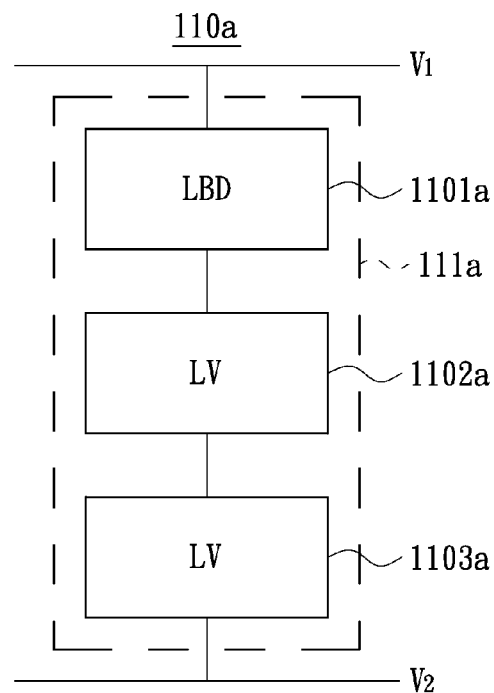
FIG. 11A schematically illustrates an electrostatic discharge protection circuit with an electrostatic discharge clamp circuit including a low breakdown voltage device and two low voltage semiconductor switches, which are connected in the same manner as shown in FIG. 5A.
Figure 11B:
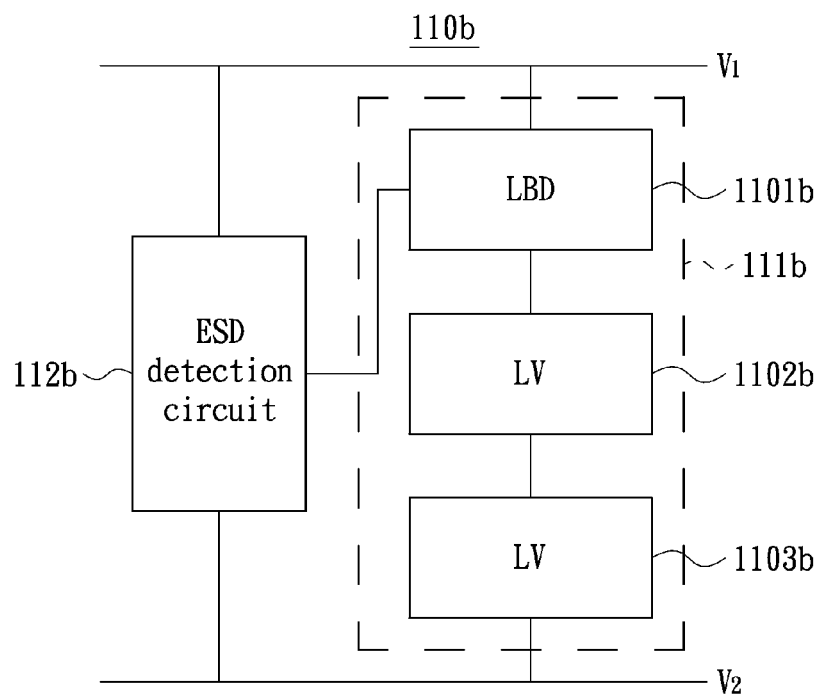
FIG. 11B schematically illustrates an electrostatic discharge protection circuit with an electrostatic discharge clamp circuit and an electrostatic discharge detection circuit, wherein the electrostatic discharge clamp circuit includes a low breakdown voltage device and two low voltage semiconductor switches connected in the same manner as shown in FIG. 5E.

In the fifth embodiment of FIGS. 11A and 11B, the first semiconductor switch is a low breakdown voltage device (LBD), and the second semiconductor switch and the third semiconductor switch are low voltage semiconductor switches (LV). The breakdown voltage of the low breakdown voltage device (LBD) is lower than the voltage at the first voltage terminal V1. The breakdown voltage of each low voltage semiconductor switch (LV) is lower than the voltage at the first voltage terminal V1. The electrostatic discharge protection circuit 110a of FIG. 11A only includes an electrostatic discharge clamp circuit 111a. The electrostatic discharge protection circuit 110b of FIG. 11B includes an electrostatic discharge clamp circuit 111b and an electrostatic discharge detection circuit 112b.

FIG. 11A schematically illustrates an electrostatic discharge protection circuit with an electrostatic discharge clamp circuit including a low breakdown voltage device and two low voltage semiconductor switches, which are electrically connected in the same manner as shown in FIG. 5A.

As shown in FIG. 11A, the electrostatic discharge protection circuit 110a includes only an electrostatic discharge clamp circuit 111a. The electrostatic discharge clamp circuit 111a includes a low breakdown voltage device (LBD) 1101a and two low voltage semiconductor switches (LV) 1102a, 1103a, which are electrically connected in series.

FIG. 11B schematically illustrates an electrostatic discharge protection circuit with an electrostatic discharge clamp circuit and an electrostatic discharge detection circuit, wherein the electrostatic discharge clamp circuit includes a low breakdown voltage device and two low voltage semiconductor switches electrically connected in the same manner as shown in FIG. 5E.

As shown in FIG. 11B, the electrostatic discharge protection circuit 110b includes an electrostatic discharge clamp circuit 111b and an electrostatic discharge detection circuit 112b. The electrostatic discharge clamp circuit 111b includes a low breakdown voltage device (LBD) 1101b and two low voltage semiconductor switches (LV) 1102b, 1103b. These semiconductor switches are serially electrically connected between the first voltage terminal V1 and the second voltage terminal V2. In addition, the low breakdown voltage device (LBD) 1101b is electrically connected to the electrostatic discharge detection circuit 112b in the gate-driven manner or the substrate-triggered manner.

Figure 12A:
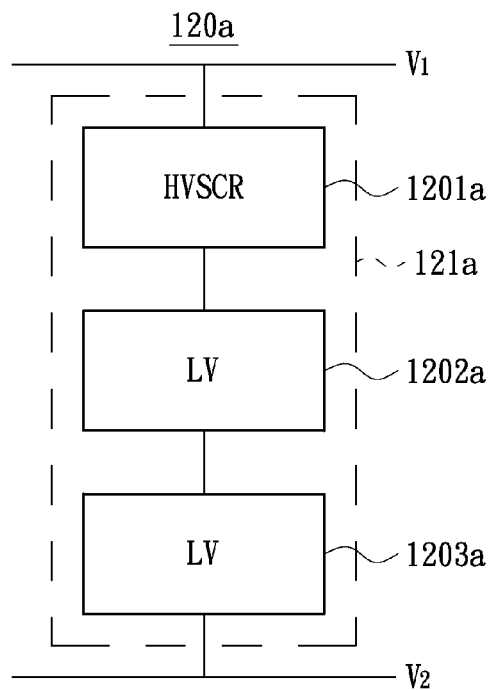
FIG. 12A schematically illustrates an electrostatic discharge protection circuit with an electrostatic discharge clamp circuit including a high voltage silicon-controlled rectifier and two low voltage semiconductor switches, which are connected in the same manner as shown in FIG. 5A.
Figure 12B:
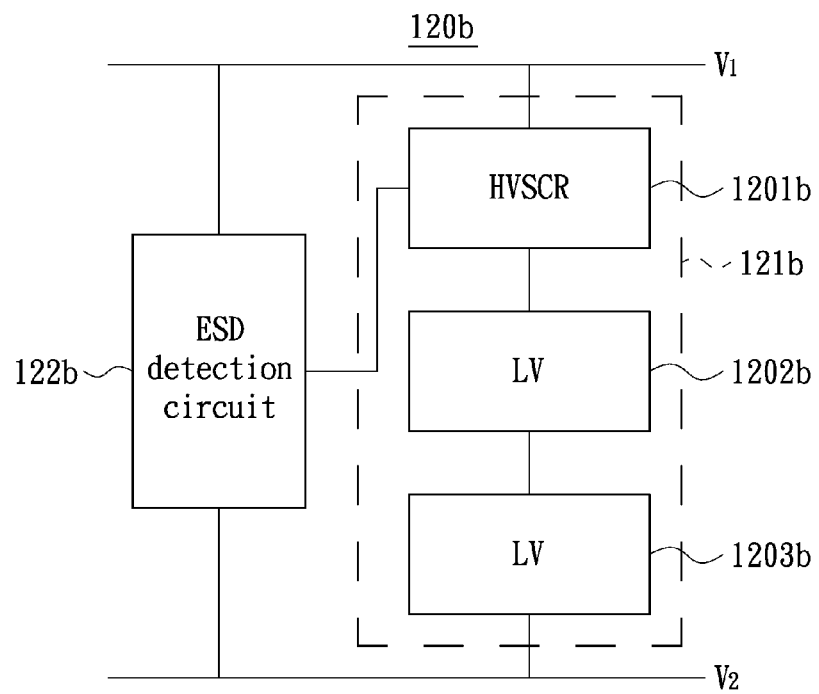
FIG. 12B schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two low voltage semiconductor switches connected in the same manner as shown in FIG. 5E.

In the sixth embodiment of FIGS. 12A and 12B, the first semiconductor switch is a high voltage silicon-controlled rectifier (HVSCR), and the second semiconductor switch and the third semiconductor switch are low voltage semiconductor switches (LV). The breakdown voltage of the high voltage silicon-controlled rectifier (HVSCR) is higher than the voltage at the first voltage terminal V1. The breakdown voltage of each low voltage semiconductor switch (LV) is lower than the voltage at the first voltage terminal V1. The electrostatic discharge protection circuit 120a of FIG. 12A only includes an electrostatic discharge clamp circuit 121a. The electrostatic discharge protection circuit 120b of FIG. 12B includes an electrostatic discharge clamp circuit 121b and an electrostatic discharge detection circuit 122b.

FIG. 12A schematically illustrates an electrostatic discharge protection circuit with an electrostatic discharge clamp circuit including a high voltage silicon-controlled rectifier and two low voltage semiconductor switches, which are electrically connected in the same manner as shown in FIG. 5A.

As shown in FIG. 12A, the electrostatic discharge protection circuit 120a includes only an electrostatic discharge clamp circuit 121a. The electrostatic discharge clamp circuit 121a includes a high voltage silicon-controlled rectifier (HVSCR) 1201a and two low voltage semiconductor switches (LV) 1202a, 1203a, which are electrically connected in series.

FIG. 12B schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two low voltage semiconductor switches electrically connected in the same manner as shown in FIG. 5E.

As shown in FIG. 12B, the electrostatic discharge protection circuit 120b includes an electrostatic discharge clamp circuit 121b and an electrostatic discharge detection circuit 122b. The electrostatic discharge clamp circuit 121b includes a high voltage silicon-controlled rectifier (first HVSCR) 1201b and two low voltage semiconductor switches (LV) 1202b, 1203b. These semiconductor switches are serially electrically connected between the first voltage terminal V1 and the second voltage terminal V2. In addition, a terminal of the high voltage silicon-controlled rectifier (first HVSCR) 1201b is electrically connected to the electrostatic discharge detection circuit 122b in the gate-driven manner or the substrate-triggered manner.

In the embodiments of FIGS. 10~12, the second semiconductor switch and the third semiconductor switch included in each electrostatic discharge clamp circuit are low voltage semiconductor switches (LV). Whereas, in the embodiments of FIGS. 13~15, the second semiconductor switch and the third semiconductor switch included in each electrostatic discharge clamp circuit are high gate low voltage semiconductor switches (HGLV), and the semiconductor switches are electrically connected in the manner as shown in FIGS. 5A, 5B and 5E. In these embodiments, the electrostatic discharge clamp circuit with two high gate low voltage semiconductor switches (HGLV) is illustrated. It is noted that the number of the high gate low voltage semiconductor switches (HGLV) may be adjusted according to the practical requirements.

Figure 13A:
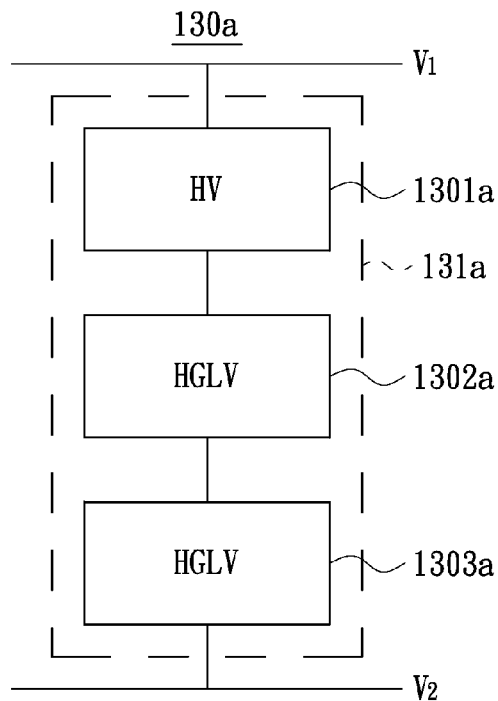
FIG. 13A schematically illustrates an electrostatic discharge protection circuit with an electrostatic discharge clamp circuit including a high voltage semiconductor switch and two high gate low voltage semiconductor switches, which are connected in the same manner as shown in FIG. 5A.
Figure 13B:
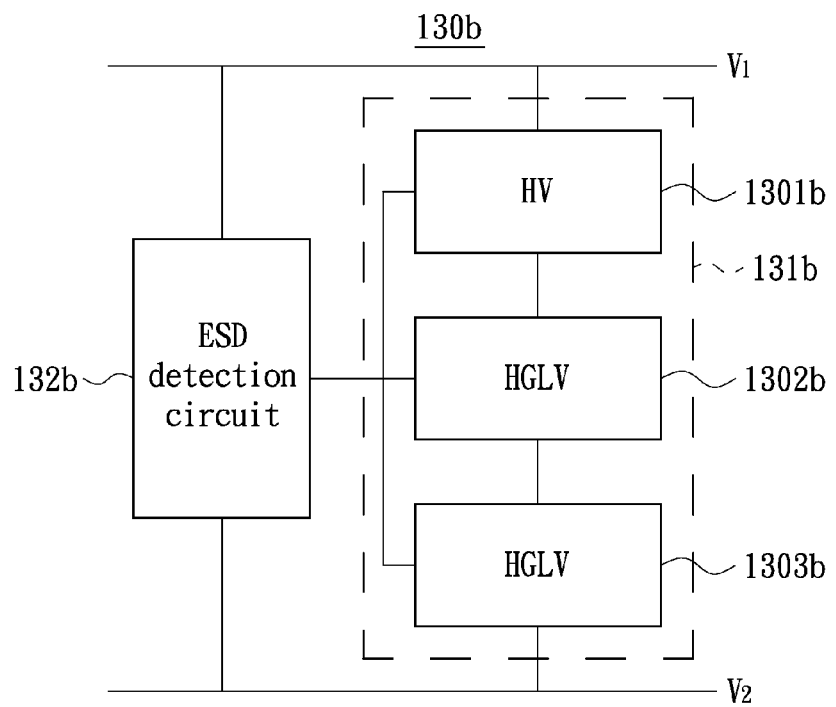
FIG. 13B schematically illustrates an electrostatic discharge protection circuit with an electrostatic discharge clamp circuit and an electrostatic discharge detection circuit, wherein the electrostatic discharge clamp circuit includes a high voltage semiconductor switch and two high gate low voltage semiconductor switches connected in the same manner as shown in FIG. 5B.
Figure 13C:
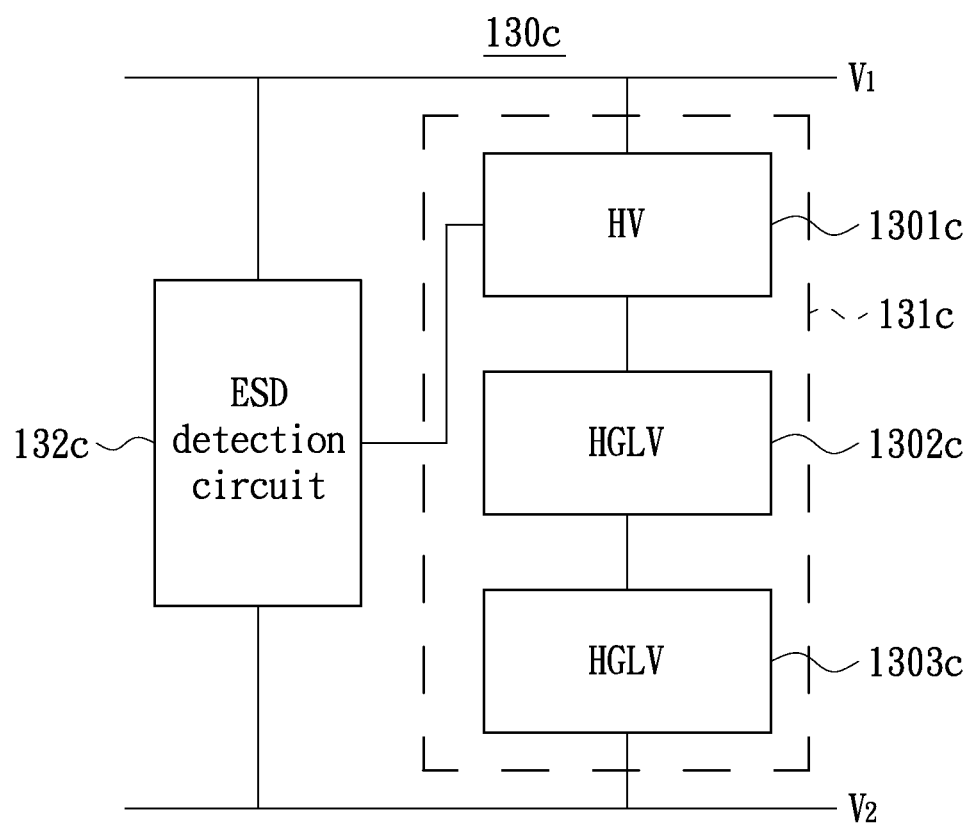
FIG. 13C schematically illustrates an electrostatic discharge protection circuit with an electrostatic discharge clamp circuit and an electrostatic discharge detection circuit, wherein the electrostatic discharge clamp circuit includes a high voltage semiconductor switch and two high gate low voltage semiconductor switches connected in the same manner as shown in FIG. 5E.

In the seventh embodiment of FIGS. 13A, 13B and 13C, the first semiconductor switch is a high voltage semiconductor switch (HV), and the second semiconductor switch and the third semiconductor switch are high gate low voltage semiconductor switches (HGLV). The breakdown voltage of the high voltage semiconductor switch (HV) is higher than the voltage at the first voltage terminal V1. The breakdown voltage of the high gate low voltage semiconductor switch (HGLV) is lower than the voltage at the first voltage terminal V1. The electrostatic discharge protection circuit 130a of FIG. 13A only includes an electrostatic discharge clamp circuit 131a. The electrostatic discharge protection circuit 130b of FIG. 13B includes an electrostatic discharge clamp circuit 131b and an electrostatic discharge detection circuit 132b. The electrostatic discharge protection circuit 130c of FIG. 13C includes an electrostatic discharge clamp circuit 131c and an electrostatic discharge detection circuit 132c.

FIG. 13A schematically illustrates an electrostatic discharge protection circuit with an electrostatic discharge clamp circuit including a high voltage semiconductor switch and two high gate low voltage semiconductor switches, which are electrically connected in the same manner as shown in FIG. 5A.

As shown in FIG. 13A, the electrostatic discharge protection circuit 130a includes only an electrostatic discharge clamp circuit 131a. The electrostatic discharge clamp circuit 131a includes a high voltage semiconductor switch (HV) 1301a and two high gate low voltage semiconductor switches (HGLV) 1302a, 1303a, which are electrically connected in series.

FIG. 13B schematically illustrates an electrostatic discharge protection circuit with an electrostatic discharge clamp circuit and an electrostatic discharge detection circuit, wherein the electrostatic discharge clamp circuit includes a high voltage semiconductor switch and two high gate low voltage semiconductor switches electrically connected in the same manner as shown in FIG. 5B.

As shown in FIG. 13B, the electrostatic discharge protection circuit 130b includes an electrostatic discharge clamp circuit 131b and an electrostatic discharge detection circuit 132b. The electrostatic discharge clamp circuit 131b includes a high voltage semiconductor switch (HV) 1301b and two high gate low voltage semiconductor switches (HGLV) 1302b, 1303b, which are electrically connected in series. The high voltage semiconductor switch and the high gate low voltage semiconductor switches are all electrically connected to the electrostatic discharge detection circuit 132b.

Similarly, depending on the gate-driven manner or the substrate-triggered manner, the relationships between the semiconductor switches of the electrostatic discharge clamp circuit 131b and the electrostatic discharge detection circuit 132b may be varied.

FIG. 13C schematically illustrates an electrostatic discharge protection circuit with an electrostatic discharge clamp circuit and an electrostatic discharge detection circuit, wherein the electrostatic discharge clamp circuit includes a high voltage semiconductor switch and two high gate low voltage semiconductor switches electrically connected in the same manner as shown in FIG. 5E.

As shown in FIG. 13C, the electrostatic discharge protection circuit 130c includes an electrostatic discharge clamp circuit 131c and an electrostatic discharge detection circuit 132c. The electrostatic discharge clamp circuit 131c includes a high voltage semiconductor switch (HV) 1301c and two high gate low voltage semiconductor switches (HGLV) 1302c, 1303c. These high gate low voltage semiconductor switches are electrically connected with each other. In addition, only the high voltage semiconductor switch (HV) 1301c is electrically connected to the electrostatic discharge detection circuit 132c in the gate-driven manner or the substrate-triggered manner.

Figure 14A:
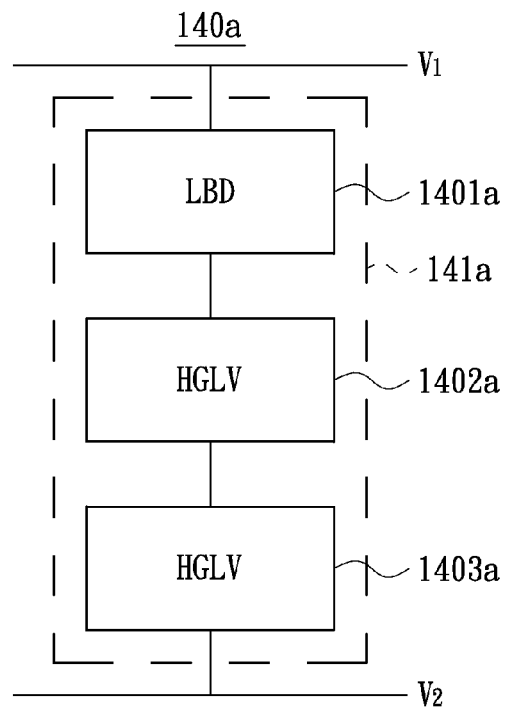
FIG. 14A schematically illustrates an electrostatic discharge protection circuit with an electrostatic discharge clamp circuit including a low breakdown voltage device and two high gate low voltage semiconductor switches, which are connected in the same manner as shown in FIG. 5A.
Figure 14B:
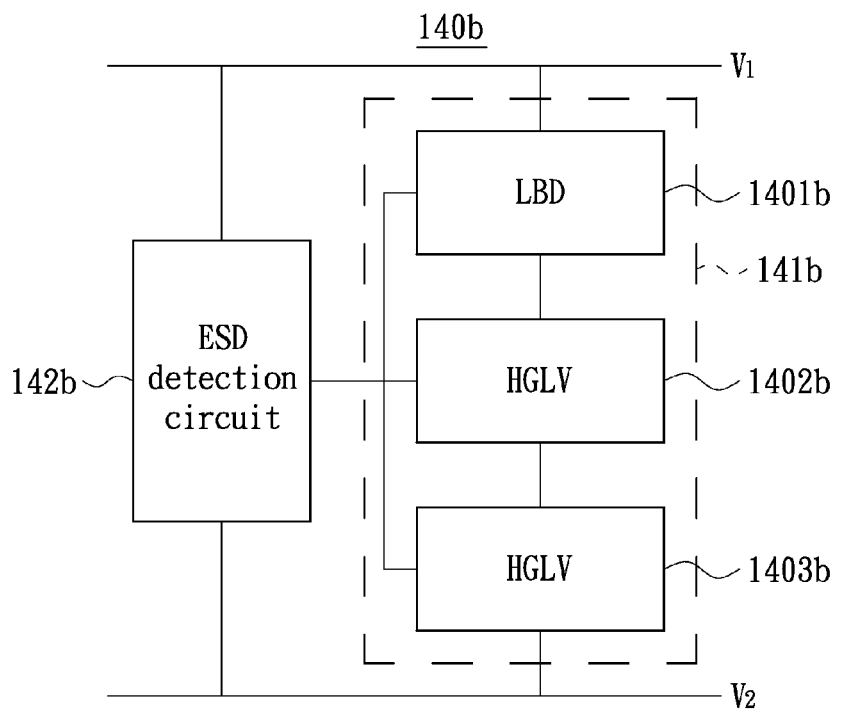
FIG. 14B schematically illustrates an electrostatic discharge protection circuit with an electrostatic discharge clamp circuit and an electrostatic discharge detection circuit, wherein the electrostatic discharge clamp circuit includes a low breakdown voltage device and two high gate low voltage semiconductor switches connected in the same manner as shown in FIG. 5B.
Figure 14C:
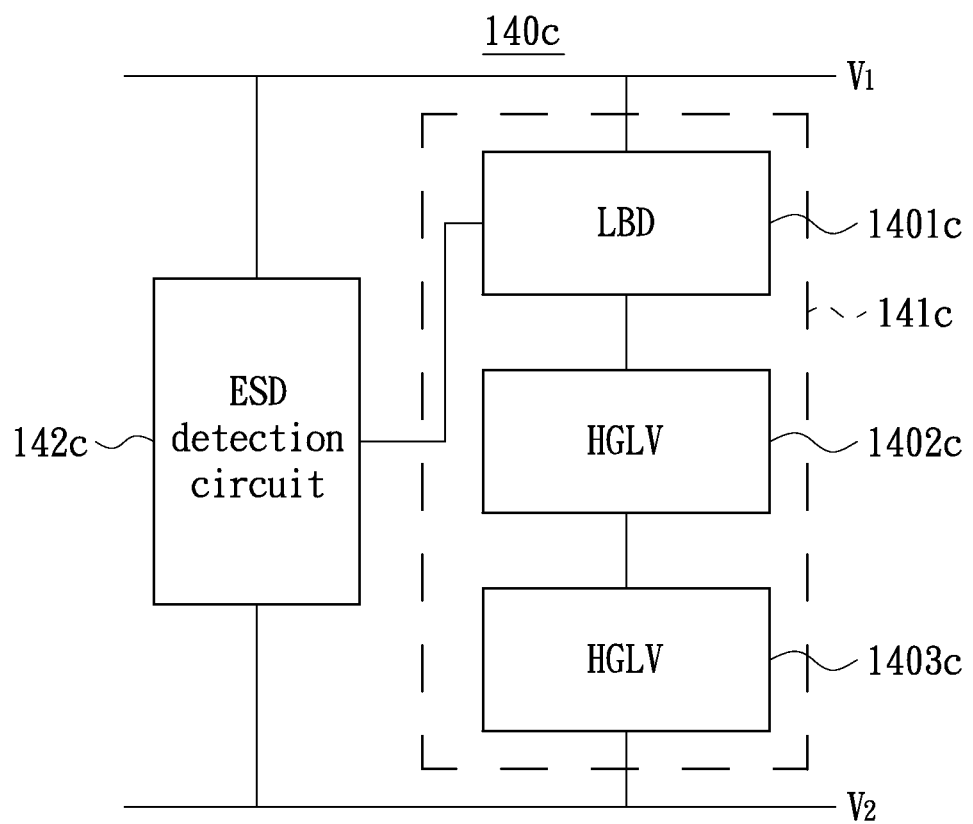
FIG. 14C schematically illustrates an electrostatic discharge protection circuit with an electrostatic discharge clamp circuit and an electrostatic discharge detection circuit, wherein the electrostatic discharge clamp circuit includes a low breakdown voltage device and two high gate low voltage semiconductor switches connected in the same manner as shown in FIG. 5E.

In the eighth embodiment of FIGS. 14A, 14B and 14C, the first semiconductor switch is a low breakdown voltage device (LBD), and the second semiconductor switch and the third semiconductor switch are high gate low voltage semiconductor switches (HGLV). The breakdown voltage of the low breakdown voltage device (LBD) is lower than the voltage at the first voltage terminal V1. The breakdown voltage of the high gate low voltage semiconductor switch (HGLV) is lower than the voltage at the first voltage terminal V1. The electrostatic discharge protection circuit 140a of FIG. 14A only includes an electrostatic discharge clamp circuit 141a. The electrostatic discharge clamp circuit 140b of FIG. 14B includes an electrostatic discharge clamp circuit 141b and an electrostatic discharge detection circuit 142b. The electrostatic discharge protection circuit 140c of FIG. 14C includes an electrostatic discharge clamp circuit 141c and an electrostatic discharge detection circuit 142c.

FIG. 14A schematically illustrates an electrostatic discharge protection circuit with an electrostatic discharge clamp circuit including a low breakdown voltage device and two high gate low voltage semiconductor switches, which are electrically connected in the same manner as shown in FIG. 5A.

As shown in FIG. 14A, the electrostatic discharge protection circuit 140a includes only an electrostatic discharge clamp circuit 141a. The electrostatic discharge clamp circuit 141a includes a low breakdown voltage device (LBD) 1401a and two high gate low voltage semiconductor switches (HGLV) 1402a, 1403a, which are electrically connected in series.

FIG. 14B schematically illustrates an electrostatic discharge protection circuit with an electrostatic discharge clamp circuit and an electrostatic discharge detection circuit, wherein the electrostatic discharge clamp circuit includes a low breakdown voltage device and two high gate low voltage semiconductor switches electrically connected in the same manner as shown in FIG. 5B.

Similarly, depending on the gate-driven manner or the substrate-triggered manner, the relationships between the semiconductor switches of the electrostatic discharge clamp circuit 141b and the electrostatic discharge detection circuit 142b may be varied.

As shown in FIG. 14B, the electrostatic discharge protection circuit 140b includes an electrostatic discharge clamp circuit 141b and an electrostatic discharge detection circuit 142b. The electrostatic discharge clamp circuit 141b includes a low breakdown voltage device (LBD) 1401b and two high gate low voltage semiconductor switches (HGLV) 1402b, 1403b. These semiconductor switches are all electrically connected to the electrostatic discharge detection circuit 142b.

FIG. 14C schematically illustrates an electrostatic discharge protection circuit with an electrostatic discharge clamp circuit and an electrostatic discharge detection circuit, wherein the electrostatic discharge clamp circuit includes a low breakdown voltage device and two high gate low voltage semiconductor switches electrically connected in the same manner as shown in FIG. 5E.

As shown in FIG. 14C, the electrostatic discharge protection circuit 140c includes an electrostatic discharge clamp circuit 141c and an electrostatic discharge detection circuit 142c. The electrostatic discharge clamp circuit 141c includes a low breakdown voltage device (LBD) 1401c and two high gate low voltage semiconductor switches (HGLV) 1402c, 1403c. These semiconductor switches are serially electrically connected between the first voltage terminal V1 and the second voltage terminal V2. In addition, the low breakdown voltage device (LBD) 1401*c* is electrically connected to the electrostatic discharge detection circuit 142*c*.

Figure 15A:
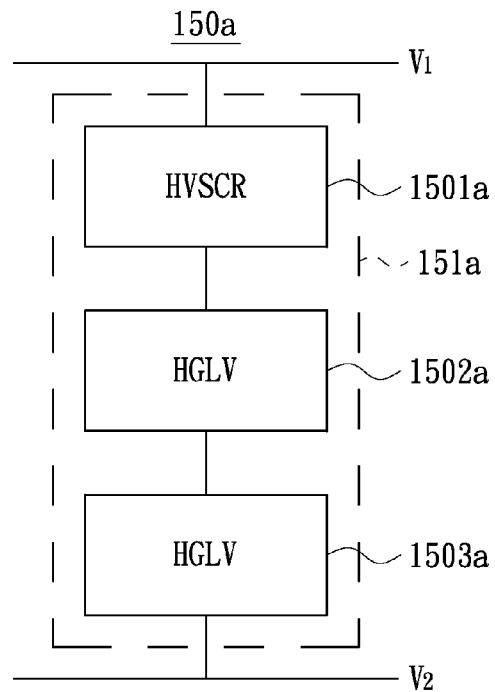
FIG. 15A schematically illustrates an electrostatic discharge protection circuit with an electrostatic discharge clamp circuit including a high voltage silicon-controlled rectifier and two high gate low voltage semiconductor switches, which are connected in the same manner as shown in FIG. 5A.
Figure 15B:
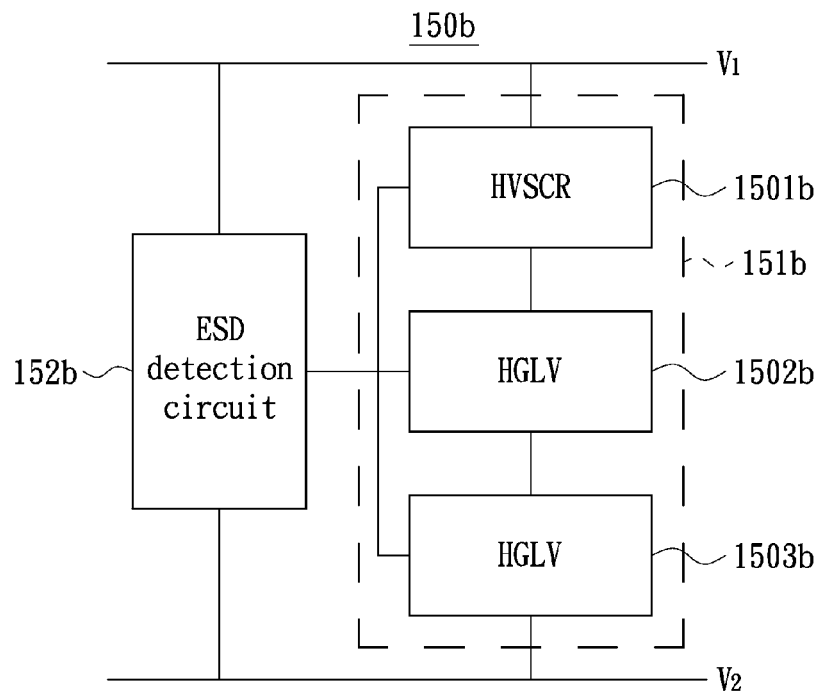
FIG. 15B schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two high gate low voltage semiconductor switches connected in the same manner as shown in FIG. 5B.
Figure 15C:
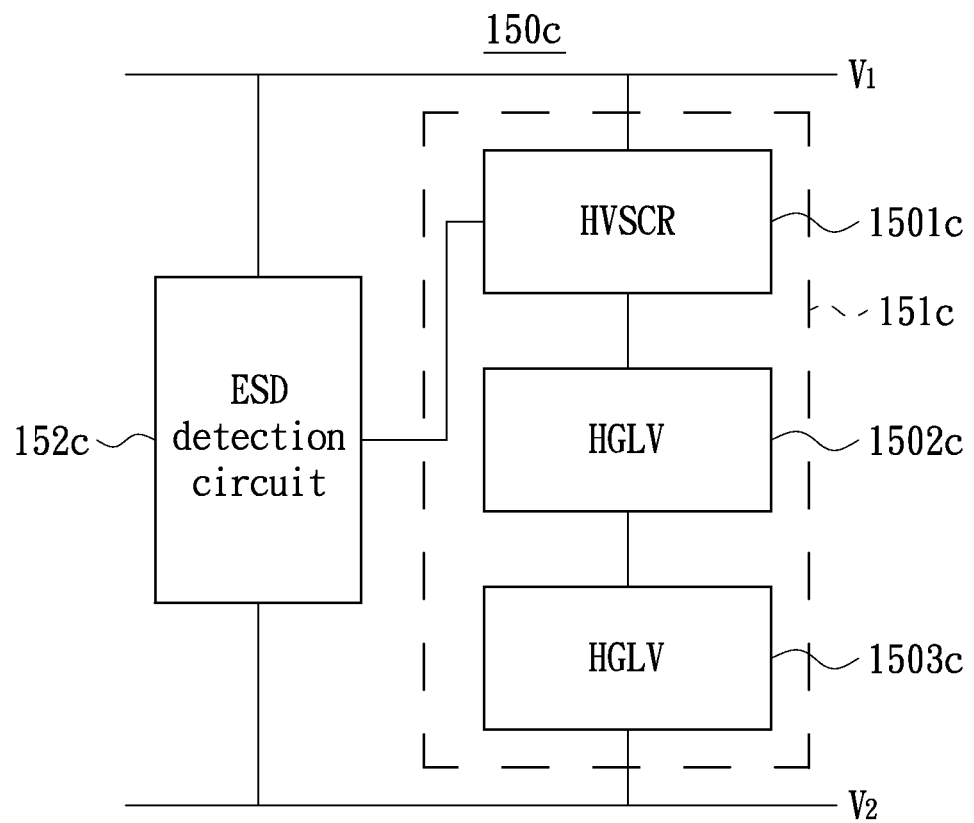
FIG. 15C schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two high gate low voltage semiconductor switches connected in the same manner as shown in FIG. 5E.

In the ninth embodiment of FIGS. 15A, 15B and 15C, the first semiconductor switch is a high voltage silicon-controlled rectifier (HVSCR), and the second semiconductor switch and the third semiconductor switch are high gate low voltage semiconductor switches (HGLV). The breakdown voltage of the high voltage silicon-controlled rectifier (HVSCR) is higher than the voltage at the first voltage terminal V1. The breakdown voltage of the high gate low voltage semiconductor switch (HGLV) is lower than the voltage at the first voltage terminal V1. The electrostatic discharge protection circuit 150*a* of FIG. 15A only includes an electrostatic discharge clamp circuit 151*a*. The electrostatic discharge protection circuit 150*b* of FIG. 15B includes an electrostatic discharge clamp circuit 151*b* and an electrostatic discharge detection circuit 152*b*. The electrostatic discharge clamp circuit 150*c* of FIG. 15C includes an electrostatic discharge clamp circuit 151*c* and an electrostatic discharge detection circuit 152*c*.

FIG. 15A schematically illustrates an electrostatic discharge protection circuit with an electrostatic discharge clamp circuit including a high voltage silicon-controlled rectifier and two high gate low voltage semiconductor switches, which are electrically connected in the same manner as shown in FIG. 5A.

As shown in FIG. 15A, the electrostatic discharge protection circuit 150*a* includes only an electrostatic discharge clamp circuit 151*a*. The electrostatic discharge clamp circuit 151*a* includes a high voltage silicon-controlled rectifier (HVSCR) 1501*a* and two high gate low voltage semiconductor switches (HGLV) 1502*a*, 1503*a*, which are electrically connected in series.

FIG. 15B schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two high gate low voltage semiconductor switches electrically connected in the same manner as shown in FIG. 5B.

As shown in FIG. 15B, the electrostatic discharge protection circuit 150*b* includes an electrostatic discharge clamp circuit 151*b* and an electrostatic discharge detection circuit 152*b*. The electrostatic discharge clamp circuit 151*b* includes a high voltage silicon-controlled rectifier (HVSCR) 1501*b* and two high gate low voltage semiconductor switches (HGLV) 1502*b*, 1503*b*. The gates of these semiconductor switches are all electrically connected to the electrostatic discharge detection circuit 152*b* in the gate-driven manner or the substrate-triggered manner.

FIG. 15C schematically illustrates an electrostatic discharge protection circuit with an electrostatic discharge clamp circuit and an electrostatic discharge detection circuit, wherein the electrostatic discharge clamp circuit includes a high voltage silicon-controlled rectifier and two high gate low voltage semiconductor switches electrically connected in the same manner as shown in FIG. 5E.

As shown in FIG. 15C, the electrostatic discharge protection circuit 140*c* includes an electrostatic discharge clamp circuit 151*c* and an electrostatic discharge detection circuit 152*c*. The electrostatic discharge clamp circuit 151*c* includes a high voltage silicon-controlled rectifier (HVSCR) 1501*c* and two high gate low voltage semiconductor switches (HGLV) 1502*c*, 1503*c*. These semiconductor switches are electrically connected with each other in series. In addition, the gate of the high voltage silicon-controlled rectifier (HVSCR) 1501*c* is electrically connected to the electrostatic discharge detection circuit 152*c* in the gate-driven manner or the substrate-triggered manner.

In the first embodiment, the second embodiment and the third embodiment, each electrostatic discharge clamp circuit includes the same types of semiconductor switches. In the first embodiment of FIG. 7, the semiconductor switches of the electrostatic discharge clamp circuit are all high voltage semiconductor switches (HV). In the second embodiment of FIG. 8, the semiconductor switches of the electrostatic discharge clamp circuit are all high voltage silicon-controlled rectifiers (HVSCR). In the third embodiment of FIG. 9, the semiconductor switches of the electrostatic discharge clamp circuit are all low breakdown voltage devices (LBD).

In the fourth embodiment to the ninth embodiment, different types of semiconductor switches are combined to define the electrostatic discharge clamp circuit. In the embodiments of FIGS. 10~12, the second semiconductor switch and the third semiconductor switch included in each electrostatic discharge clamp circuit are low voltage semiconductor switches (LV). In the embodiments of FIGS. 13~15, the second semiconductor switch and the third semiconductor switch included in each electrostatic discharge clamp circuit are high gate low voltage semiconductor switches (HGLV).

In the fourth embodiment of FIG. 10, a high voltage semiconductor switch (HV) and two low voltage semiconductor switches (LV) are combined to define the electrostatic discharge clamp circuit. In the fifth embodiment of FIG. 11, a low breakdown voltage device (LBD) and two low voltage semiconductor switches (LV) are combined to define the electrostatic discharge clamp circuit. In the sixth embodiment of FIG. 12, a high voltage silicon-controlled rectifier (HVSCR) and two low voltage semiconductor switches (LV) are combined to define the electrostatic discharge clamp circuit.

In the seventh embodiment of FIG. 13, a high voltage semiconductor switch (HV) and two high gate low voltage semiconductor switches (HGLV) are combined to define the electrostatic discharge clamp circuit. In the eighth embodiment of FIG. 14, a low breakdown voltage device (LBD) and two high gate low voltage semiconductor switches (HGLV) are combined to define the electrostatic discharge clamp circuit. In the ninth embodiment of FIG. 15, a high voltage silicon-controlled rectifier (HVSCR) and two high gate low voltage semiconductor switches (HGLV) are combined to define the electrostatic discharge clamp circuit.

From the above description, by adjusting the stack number of the semiconductor switches, the stacked structure of the semiconductor switches has a holding voltage higher than the voltage of the voltage source at the snapback breakdown status. For example, the voltage of the voltage source is 30V. In some circumstances, the voltage of the voltage source is 10V. As a consequence, the electrostatic discharge protection circuit of the present invention is capable of avoiding the transient latch-up problem or similar problems without the need of adding or changing the fabricating process.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An electrostatic discharge protection circuit located between a first voltage terminal and a second voltage terminal, the electrostatic discharge protection circuit comprising:
   a first semiconductor switch electrically connected to the first voltage terminal, wherein if a voltage at the first voltage terminal complies with a starting condition, the first semiconductor switch is turned on, so that an electrostatic discharge current flows through the first voltage terminal and the first semiconductor switch; and
   a second semiconductor switch electrically connected between the first semiconductor switch and the second voltage terminal, wherein the electrostatic discharge current from the first semiconductor switch passes to the second voltage terminal through the second semiconductor switch;
   wherein the first semiconductor switch is a high voltage silicon-controlled rectifier having a breakdown voltage higher than the voltage at the first voltage terminal and the second semiconductor switch is a low voltage semiconductor switch having a breakdown voltage lower than the voltage at the first voltage terminal.

2. The electrostatic discharge protection circuit according to claim 1, wherein the first semiconductor switch is a first transistor, and the second semiconductor switch is a second transistor, wherein a first terminal and a second terminal of the first transistor are respectively connected to the first voltage terminal and the second transistor, and a first terminal and a second terminal of the second transistor are respectively connected to the first transistor and the second voltage terminal.

3. The electrostatic discharge protection circuit according to claim 2, wherein a gate of the first transistor is connected with a gate of the second transistor.

4. The electrostatic discharge protection circuit according to claim 2, wherein a gate of the second transistor is connected with the second terminal of the first transistor.

5. The electrostatic discharge protection circuit according to claim 1, further comprising an electrostatic discharge detection circuit, which is located between the first voltage terminal and the second voltage terminal,
   wherein if the voltage at the first voltage terminal complies with the starting condition, a trigger voltage is outputted from the electrostatic discharge detection circuit to the first semiconductor switch, wherein in response to the trigger voltage, the electrostatic discharge current is generated.

6. The electrostatic discharge protection circuit according to claim 1, further comprising a third semiconductor switch, which is electrically connected between the second semiconductor switch and the second voltage terminal, wherein the electrostatic discharge current from the second semiconductor switch passes to the second voltage terminal through the third semiconductor switch.

7. The electrostatic discharge protection circuit according to claim 1, wherein the starting condition is satisfied when the voltage at the first voltage terminal is higher than a start threshold voltage.

8. The electrostatic discharge protection circuit according to claim 7, wherein the electrostatic discharge protection circuit is operated with a functional circuit, wherein the start threshold voltage is lower than a failure threshold voltage of the functional circuit.

9. An electrostatic discharge protection circuit located between a first voltage terminal and a second voltage terminal, the electrostatic discharge protection circuit comprising:
   a first semiconductor switch electrically connected to the first voltage terminal, wherein if a voltage at the first voltage terminal complies with a starting condition, the first semiconductor switch is turned on, so that an electrostatic discharge current flows through the first voltage terminal and the first semiconductor switch; and
   a second semiconductor switch electrically connected between the first semiconductor switch and the second voltage terminal, wherein the electrostatic discharge current from the first semiconductor switch passes to the second voltage terminal through the second semiconductor switch;
   wherein the first semiconductor switch and the second semiconductor switch are low breakdown voltage devices, wherein each of the first semiconductor switch and the second semiconductor switch has a breakdown voltage lower than the voltage at the first voltage terminal.

10. The electrostatic discharge protection circuit according to claim 9, wherein the first semiconductor switch is a first transistor, and the second semiconductor switch is a second transistor, wherein a first terminal and a second terminal of the first transistor are respectively connected to the first voltage terminal and the second transistor, and a first terminal and a second terminal of the second transistor are respectively connected to the first transistor and the second voltage terminal.

11. The electrostatic discharge protection circuit according to claim 9, wherein a gate of the first transistor is connected with a gate of the second transistor.

12. The electrostatic discharge protection circuit according to claim 9, wherein a gate of the second transistor is connected with the second terminal of the first transistor.

13. The electrostatic discharge protection circuit according to claim 9, further comprising an electrostatic discharge detection circuit, which is located between the first voltage terminal and the second voltage terminal,
   wherein if the voltage at the first voltage terminal complies with the starting condition, a trigger voltage is outputted from the electrostatic discharge detection circuit to the first semiconductor switch, wherein in response to the trigger voltage, the electrostatic discharge current is generated.

14. The electrostatic discharge protection circuit according to claim 9, further comprising a third semiconductor switch, which is electrically connected between the second semiconductor switch and the second voltage terminal, wherein the electrostatic discharge current from the second semiconductor switch passes to the second voltage terminal through the third semiconductor switch.

15. A electrostatic discharge protection circuit located between a first voltage and a second voltage terminal, the electrostatic discharge protection circuit comprising:
   a first semiconductor switch electrically connected to the first voltage terminal, wherein if a voltage at the first voltage terminal complies with a starting condition, the first semiconductor switch is turned on, so that an electrostatic discharge current flows through the first voltage terminal and the first semiconductor switch; and
   a second semiconductor switch electrically connected between the first semiconductor switch and the second voltage terminal, wherein the electrostatic discharge current from the first semiconductor switch passes to the second voltage terminal through the second semiconductor switch;
   wherein the first semiconductor switch is a low breakdown voltage device having a breakdown voltage lower than the voltage at the first voltage terminal, and the second semiconductor switch is a low voltage semiconductor switch having a breakdown voltage lower than the voltage at the first voltage terminal.

16. The electrostatic discharge protection circuit according to claim 15, wherein the first semiconductor switch is a first transistor, and the second semiconductor switch is a second transistor, wherein a first terminal and a second terminal of the first transistor are respectively connected to the first voltage terminal and the second transistor, and a first terminal and a second terminal of the second transistor are respectively connected to the first transistor and the second voltage terminal.

17. The electrostatic discharge protection circuit according to claim 15, wherein a gate of the first transistor is connected with a gate of the second transistor.

18. The electrostatic discharge protection circuit according to claim 15, wherein a gate of the second transistor is connected with the second terminal of the first transistor.

19. The electrostatic discharge protection circuit according to claim 15, further comprising an electrostatic discharge detection circuit, which is located between the first voltage terminal and the second voltage terminal,
wherein if the voltage at the first voltage terminal complies with the starting condition, a trigger voltage is outputted from the electrostatic discharge detection circuit to the first semiconductor switch, wherein in response to the trigger voltage, the electrostatic discharge current is generated.

20. The electrostatic discharge protection circuit according to claim 15, further comprising a third semiconductor switch, which is electrically connected between the second semiconductor switch and the second voltage terminal, wherein the electrostatic discharge current from the second semiconductor switch passes to the second voltage terminal through the third semiconductor switch.

21. An electrostatic discharge protection circuit located between a first voltage terminal and a second voltage terminal, the electrostatic discharge protection circuit comprising:
a first semiconductor switch electrically connected to the first voltage terminal, wherein if a voltage at the first voltage terminal complies with a starting condition, the first semiconductor switch is turned on, so that an electrostatic discharge current flows through the first voltage terminal and the first semiconductor switch; and
a second semiconductor switch electrically connected between the first semiconductor switch and the second voltage terminal, wherein the electrostatic discharge current from the first semiconductor switch passes to the second voltage terminal through the second semiconductor switch;
wherein the first semiconductor switch is a high voltage semiconductor switch having a breakdown voltage higher than the voltage at the first voltage terminal, and the second semiconductor switch is a high gate low voltage semiconductor switch having a breakdown voltage lower than the voltage at the first voltage terminal.

22. The electrostatic discharge protection circuit according to claim 21, wherein the first semiconductor switch is a high voltage silicon-controlled rectifier having a breakdown voltage higher than the voltage at the first voltage terminal, and the second semiconductor switch is a high gate low voltage semiconductor switch having a breakdown voltage lower than the voltage at the first voltage terminal.

23. The electrostatic discharge protection circuit according to claim 21, wherein the first semiconductor switch is a first transistor, and the second semiconductor switch is a second transistor, wherein a first terminal and a second terminal of the first transistor are respectively connected to the first voltage terminal and the second transistor, and a first terminal and a second terminal of the second transistor are respectively connected to the first transistor and the second voltage terminal.

24. The electrostatic discharge protection circuit according to claim 21, wherein a gate of the first transistor is connected with a gate of the second transistor.

25. The electrostatic discharge protection circuit according to claim 21, wherein a gate of the second transistor is connected with the second terminal of the first transistor.

26. The electrostatic discharge protection circuit according to claim 21, further comprising an electrostatic discharge detection circuit, which is located between the first voltage terminal and the second voltage terminal,
wherein if the voltage at the first voltage terminal complies with the starting condition, a trigger voltage is outputted from the electrostatic discharge detection circuit to the first semiconductor switch, wherein in response to the trigger voltage, the electrostatic discharge current is generated.

27. The electrostatic discharge protection circuit according to claim 21, further comprising a third semiconductor switch, which is electrically connected between the second semiconductor switch and the second voltage terminal, wherein the electrostatic discharge current from the second semiconductor switch passes to the second voltage terminal through the third semiconductor switch.

* * * * *